(12) United States Patent
Soliman et al.

(10) Patent No.: US 8,102,929 B2
(45) Date of Patent: Jan. 24, 2012

(54) LOW POWER ULTRA WIDEBAND TRANSCEIVER

(75) Inventors: Samir Soliman, San Diego, CA (US); Ozgur Dural, San Diego, CA (US); Krishnan Rajamani, San Diego, CA (US); Rabih Chrabieh, Paris (FR)

(73) Assignee: QUALCOMM Incorporated, San Diego, CA (US)

( * ) Notice: Subject to any disclaimer, the term of this patent is extended or adjusted under 35 U.S.C. 154(b) by 528 days.

(21) Appl. No.: 12/369,926

(22) Filed: Feb. 12, 2009

(65) Prior Publication Data

US 2010/0202493 A1   Aug. 12, 2010

(51) Int. Cl.
H04K 1/10 (2006.01)
H04L 27/28 (2006.01)

(52) U.S. Cl. ......... 375/260; 375/295; 375/297; 455/522

(58) Field of Classification Search .................. 375/260, 375/295, 297; 455/522, 114.3
See application file for complete search history.

(56) References Cited

U.S. PATENT DOCUMENTS

| | | | |
|---|---|---|---|
| 6,996,382 B2 * | 2/2006 | Higuchi | 455/126 |
| 7,653,122 B2 | 1/2010 | Siriwongpairat et al. | |
| 7,664,161 B2 * | 2/2010 | Norimatsu et al. | 375/130 |
| 7,983,356 B2 * | 7/2011 | Chrabieh et al. | 375/295 |
| 2008/0205569 A1 | 8/2008 | Kwak | |

OTHER PUBLICATIONS

International Search Report & Written Opinion—PCT/US2010/024012, International Search Authority—European Patent Office—May 20, 2010.
Snow C et al: "Performance analysis of multiband OFDM for UWB communication" Communications, 2005. ICC 2005. 2005 IEEE International Conference on Seoul, Korea May 16-20, 2005, Piscataway, NJ, USA,IEEE LNKD-D0I:10.1109/ICC.2005.1494814, vol. 4, May 16, 2005, pp. 2573-2578, XP010825652 ISBN: 978-0-7803-8938-0 sections II.A,II.C, IVfigure 1 1-40 Form PCT/.

* cited by examiner

*Primary Examiner* — Ted Wang
(74) *Attorney, Agent, or Firm* — Qualcomm Patent Group; Alan C. Gordon; James H. Yancey, Jr.

(57) ABSTRACT

Low-power transmitter and/or receiver devices are provided by sacrificing time and/or frequency diversity in exchange for lower power consumption. When channel conditions indicate that time and/or frequency spreading are unnecessary for transmissions, a transmitter may enter into a power-conservation mode in which transmissions are performed using a time gating scheme or a time repetition scheme. In the time gating scheme, symbols are transmitting just once, rather than a plurality of times, but with increased transmission power. In the time repetition scheme, copies of the same symbol are transmitted a plurality of times on the same frequency on different symbol transmission periods, instead of being retransmitted on different frequencies on different symbol transmission periods. Consequently, the symbol can be generated once and stored for subsequent retransmission, thereby allowing some of the transmitter/receiver chain components can be operated at a lower duty cycle or processing speed to conserve power.

40 Claims, 28 Drawing Sheets

|  | Band Group #1 | Band Group #2 | Band Group #3 | Band Group #4 | Band Group #5 | Band Group #6 |
|---|---|---|---|---|---|---|
| TFC #1 | 1,2,3,1,2,3 | 4,5,6,4,5,6 | 7,8,9,7,8,9 | 10,11,12,10,11,12 | N/A | 9,10,11,9,10,11 |
| TFC #2 | 1,3,2,1,3,2 | 4,6,5,4,6,5 | 7,9,8,7,9,8 | 10,12,11,10,12,11 | N/A | 9,10,11,9,10,11 |
| TFC #3 | 1,1,2,2,3,3 | 4,4,5,5,6,6 | 7,7,8,8,9,9 | 10,10,11,11,12,12 | N/A | 9,9,10,10,11,11 |
| TFC #4 | 1,1,3,3,2,2 | 4,4,6,6,5,5 | 7,7,9,9,8,8 | 10,10,12,12,11,11 | N/A | 9,9,10,10,11,11 |
| TFC #5 | 1,1,1,1,1,1 | 4,4,4,4,4,4 | 7,7,7,7,7,7 | 10,10,10,10,10,10 | 13,13,13,13,13,13 | 9,9,9,9,9, |
| TFC #6 | 2,2,2,2,2,2 | 5,5,5,5,5,5 | 8,8,8,8,8,8 | 11,11,11,11,11,11 | 14,14,14,14,14,14 | 10,10,10,10,10,10 |
| TFC #7 | 3,3,3,3,3,3 | 6,6,6,6,6,6 | 9,9,9,9,9,9 | 12,12,12,12,12,12 | N/A | 11,11,11,11,11,11 |
| TFC #8 | 1,2,1,2,1,2 | 4,5,4,5,4,5 | 7,8,7,8,7,8 | 10,11,10,11,10,11 | 13,14,13,14,13,14 | 9,10,9,10,9,10 |
| TFC #9 | 1,3,1,3,1,3 | 4,6,4,6,4,6 | 7,9,7,9,7,9 | 10,12,10,12,10,12 | N/A | 9,11,9,11,9,11 |
| TFC #10 | 2,3,2,3,2,3 | 5,6,5,6,5,6 | 8,9,8,9,8,9 | 11,12,11,12,11,12 | N/A | 10,11,10,11,10,11 |

|  | Band Group # 1 | Band Group # 2 | Band Group # 3 | Band Group # 4 | Band Group # 5 | Band Group # 6 |
|---|---|---|---|---|---|---|
| TFC # 1 | Channel # 09 | Channel # 17 | Channel # 25 | Channel # 33 | N/A | Channel # 49 |
| TFC # 2 | Channel # 10 | Channel # 18 | Channel # 26 | Channel # 34 | N/A | Channel # 50 |
| TFC # 3 | Channel # 11 | Channel # 19 | Channel # 27 | Channel # 35 | N/A | Channel # 51 |
| TFC # 4 | Channel # 12 | Channel # 20 | Channel # 28 | Channel # 36 | N/A | Channel # 52 |
| TFC # 5 | Channel # 13 | Channel # 21 | Channel # 29 | Channel # 37 | Channel # 45 | Channel # 53 |
| TFC # 6 | Channel # 14 | Channel # 22 | Channel # 30 | Channel # 38 | Channel # 46 | Channel # 54 |
| TFC # 7 | Channel # 15 | Channel # 23 | Channel # 31 | Channel # 39 | N/A | Channel # 55 |
| TFC # 8 | Channel # 72 | Channel # 80 | Channel # 88 | Channel # 96 | Channel # 104 | Channel # 112 |
| TFC # 9 | Channel # 73 | Channel # 81 | Channel # 89 | Channel # 97 | N/A | Channel # 113 |
| TFC # 10 | Channel # 74 | Channel # 82 | Channel # 90 | Channel # 98 | N/A | Channel # 114 |

*SAMPLE UWB SYMBOL TRANSMISSION*

| Data Rate (Mbps) | Modulation Type | Code Rate R | Frequency Domain Spreading | Time Domain Spreading |
|---|---|---|---|---|
| 53.3 | QPSK | 1/3 | Yes | Yes |
| 80.0 | QPSK | 1/2 | Yes | Yes |
| 106.7 | QPSK | 1/3 | No | Yes |
| 160 | QPSK | 1/2 | No | Yes |
| 200 | QPSK | 5/8 | No | Yes |
| 320 | DCM | 1/2 | No | No |
| 400 | DCM | 5/8 | No | No |
| 480 | DCM | 3/4 | No | No |

*MODULATION PARAMETERS FOR ECMA-368 STANDARD*

FIGURE 7

LOW-POWER TRANSMISSION METHOD

*TIME REPETITION METHOD AT TRANSMITTER*

LOW POWER ULTRA WIDEBAND TRANSCEIVER

BACKGROUND

1. Field

Various features pertain to ultra wideband communications. At least one aspect pertains to an ultra wideband transceiver having improved low-power consumption.

2. Background

Ultra-wideband (UWB) is a radio technology that can be used for high-bandwidth communications by using a large portion of the radio spectrum (e.g., bandwidth of 500 MHz or greater). UWB communications transmit in a way that does not interfere largely with other more traditional "narrow band" and continuous carrier waves in the same frequency band. Generally, the Federal Communications Commission (FCC) defines UWB as a system using a bandwidth that exceeds the lesser of 500 megahertz (MHz), or 20% of the center frequency. The FCC uses −10 dB emission points to determine bandwidth, and to define the center frequency. UWB technology may be applicable to high and low data rate personal area networks (PANs). The advantage of the large bandwidth is that the system should be able to deliver high data rates over short distances, while sharing the spectrum with other communications systems. For this reason, the FCC has authorized the unlicensed use of UWB in the band between 3.1 gigahertz (GHz) and 10.6 GHz. UWB can be generated as a pulse type system, where each transmitted pulse occupies the entire UWB frequency bandwidth. An aggregation of narrowband subcarriers are used to generate at least 500 MHz of frequency bandwidth. For example, an orthogonal frequency division multiplexing (OFDM) system may be used. OFDM splits the digital information to be transmitted over a plurality of parallel slower data rate streams. Each of the parallel data streams is modulated onto a particular subcarrier, using a technique such a quadrature phase shift keying (QPSK) for example, and transmitted at a relatively low data rate. The subcarrier frequency is chosen to minimize crosstalk between adjacent channels, which is referred to as orthogonality. The relatively long symbol duration helps minimize the effects of multipath, which is the degradation caused by signals arriving at different times.

The UWB European Computer Manufacturers Association (ECMA) 368 standard is an example of a wireless standard that seeks to implement UWB.

One challenge with the current UWB technology is that it may consume too much power to be efficiently implemented on mobile devices (e.g., mobile phones, personal communication devices, mobile computing devices, etc.) that have limited power sources. That is, current consumption of UWB transceivers may not be suitable for mobile devices.

Consequently, improvements to UWB transceivers are desirable to achieve lower power consumption. Preferably, such improvements to UWB transceivers would substantially comply with, or are compatible with, existing UWB standards.

SUMMARY

According to one feature, a transmitter device and/or method are provided for achieving power conservation. In some examples, the transmitter and/or method may be operated in an ultra wideband spectrum to transmit orthogonal frequency-division multiplexing (OFDM) symbols. A wireless channel characteristic is determined, ascertained, or obtained between the transmitter device and a receiver device. Determining the wireless channel characteristic may include ascertaining a desired signal strength (between the transmitter and receiver) and at least one of: a channel noise, a noise floor, or an interference level.

A first mode of symbol transmission may be selected in which at least one of time spreading and frequency spreading is enabled at a particular transmission rate if the wireless channel characteristic is above a threshold level. A symbol may be transmitted using at least one of time spreading and frequency spreading if the first mode of symbol transmission is selected.

A second mode of symbol transmission may be selected in which at least one of time spreading and frequency spreading is disabled relative to the first mode of symbol transmission and at the same particular transmission rate if the wireless channel characteristic is below the threshold level. A symbol may be transmitted while disabling at least one of time spreading and frequency spreading (which is enabled in the first mode of symbol transmission) if the second mode of symbol transmission is selected.

Time spreading may include transmitting different versions of the same symbol at a plurality of different times. Frequency spreading may include concurrently transmitting the same symbol over different frequencies.

For a first data transmission rate, the first mode of symbol transmission may utilize time spreading but the second mode of symbol transmission disables time spreading. For a second data transmission rate, the first mode of symbol transmission may utilizes both time spreading and frequency spreading but the second mode of symbol transmission disables at least one of time spreading and frequency spreading.

Prior to transmission, the transmitter may convert a symbol from a digital representation to an analog signal for transmission over an ultra wideband wireless channel associated with the wireless channel characteristic.

The transmitter may send an indicator to the receiver device that at least one of time spreading and frequency spreading is disabled.

The transmitter may be compliant with the ultra wideband European Computer Manufacturers Association (ECMA) 368 standard.

The transmitter and/or method may also reduce one of either the duty cycle or speed of an inverse Fast Fourier Transform module during the second mode of symbol transmission, where a (data) transmission rate from the wireless transmitter device remains the same despite the reduction of duty cycle or speed of the inverse Fast Fourier Transform module.

According to a time repetition scheme during the second mode of symbol transmission, the transmitter and/or method may: (a) modulate a symbol into a first frequency using an inverse Fast Fourier Transform module; (b) store the modulated symbol; (c) transmit the modulated symbol to the receiver device on a symbol transmission period; (d) retransmit the stored modulated symbol to the receiver device during other symbol transmission periods; and/or (e) disable the inverse Fast Fourier Transform module during the other symbol transmission periods when retransmitting the stored modulated symbol to conserve power.

According to a time gating scheme during the second mode of symbol transmission, the transmitter and/or method may: (a) generate a symbol for transmission using an inverse Fast Fourier Transform module; (b) transmit the symbol just once to a receiver device using greater transmission power than used in the first mode of symbol transmission to transmit symbols; and/or (c) disable the inverse Fast Fourier Transform module during time periods when the symbol would have otherwise been retransmitted in the first mode of symbol transmission.

According to one feature, a receiver device and/or method are provided for achieving power conservation. In one example, the receiver may receive an indicator from a transmitter device indicating at least one of two modes of symbol transmission. These modes of transmission may include a first mode and a second mode. In the first mode of symbol transmission, the receiver device may enable at least one of time spreading and frequency spreading for a particular transmission rate. In the second mode of symbol transmission, the receiver device may disable at least one of time spreading and frequency spreading relative to the first mode of symbol transmission and the same particular transmission rate. If operating in the second mode, the receiver may reduce one of either the duty cycle or processing speed of a Fast Fourier Transform module relative to the first mode for the same particular transmission rate.

Time spreading may include the transmission of the same symbol at a plurality of different times over different frequencies. Frequency spreading may include the concurrent transmission of the same symbol over different frequencies.

For a first data transmission rate, the first mode of symbol transmission may utilize time spreading but the second mode of symbol transmission disables time spreading. For a second data transmission rate, the first mode of symbol transmission may utilize both time spreading and frequency spreading but the second mode of symbol transmission disables at least one of time spreading and frequency spreading.

The receiver and/or method may also include (a) receiving a symbol transmitted according to the first mode, if the first mode is indicated; and/or (b) receiving a symbol transmitted according to the second mode, if the second mode is indicated.

The receiver device may include a receiver chain that includes a Fast Fourier Transform module.

The receiver device is compliant with the ultra wideband European Computer Manufacturers Association (ECMA) 368 standard.

According to a time repetition scheme when using the second mode for symbol reception, the receiver device may be adapted to: (a) receive the same version of a symbol over the same frequency over a plurality of symbol transmission periods; (b) accumulate the received versions of the symbol; (c) disable the Fast Fourier Transform until all versions of the symbol have been received to conserve power; and/or (d) process the accumulated symbol using the Fast Fourier Transform module.

According to a time repetition scheme when using the second mode for symbol reception, the receiver device may be adapted to: (a) receive a symbol just once instead of a plurality of times over a plurality of symbol transmission periods as in the first mode, wherein the symbol is transmitted at a higher power than used in the first mode for the same symbol transmission; and/or (b) disable the Fast Fourier Transform module during time periods when the symbol would have otherwise been retransmitted in the first mode of symbol transmission.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

FIG. 3 is a chart illustrating example of the time-frequency code (TFC) patterns for ten TF codes which spread data symbols over all available bands in a band group.

FIG. 4 is a chart illustrating an example of the PHY layer channelization scheme of the time-frequency codes of FIG. 3.

FIG. 7 is a table illustrating an example of modulation parameters for an ECMA 368 compliant transceiver.

DETAILED DESCRIPTION

Figure 1:
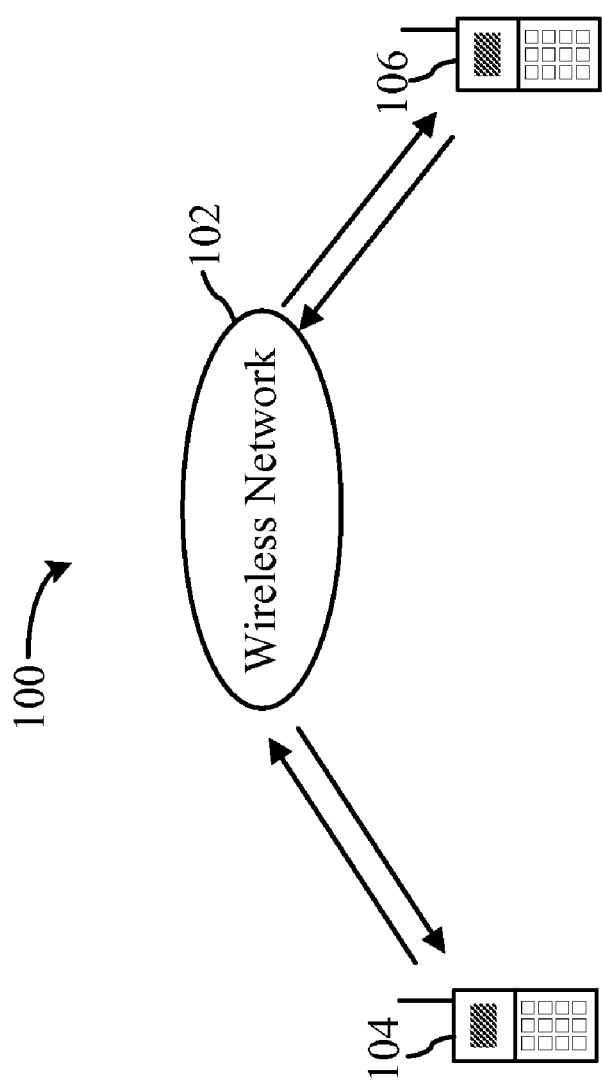
FIG. 1 is a conceptual illustration of an example of a wireless network in which a mobile access terminal implementing ultra wideband communications may operate.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

In the following description, certain terminology is used to describe certain features. The terms "access terminal", "communication device" and "UWB radio" may be interchangeably used to refer to a mobile device, mobile phone, wireless terminal, access terminal and/or other types of mobile or fixed communication apparatus capable of communicating over an UWB wireless network or system. The terms "wireless network" and "communication system" may be interchangeably used to refer to a short range communication system, such as a Multi-band Orthogonal Frequency Division Multiplexing (OFDM) UWB system. The term "transceiver" refers to a communication interface having both transmitter and receiver capabilities.

Overview

At least two solutions are proposed to reduce power consumption of UWB transmitters/receivers, allowing them to be implemented on mobile communication devices with limited power sources. In one example, these features may be applicable to transmitters/receivers operating according to a ECMA-368 UWB standard at data rates 53.3, 80, 106.7, 160 and/or 200 Mbps.

Processing at the UWB transmitter and receiver may be reduced by taking advantage of the fact that there is both time spreading and frequency spreading when operating at in 53.33 and 80 Mbps modes and time spreading when operating in 106.7, 160 and 200 Mbps modes. In the ECMA-368 UWB standard, time and frequency spreading is used to provide diversity, thereby improving transmissions. However, the use of time and/or frequency spreading means that every symbol (e.g., OFDM symbol) is processed individually. Reduction of power consumption may be achieved by reducing the amount of processing performed for each symbol to be transmitted. Additionally, significant power reduction (e.g., power conservation) is may also be achieved from cycling or reducing the speed of the IFFT, FFT, encoding and decoding blocks or modules. Consequently, it is recognized that the diversity gain provided by time and frequency spreading can be traded off in order to lower power consumption. This power conservation mode of operation can be turned On when there is enough margin in the link budget. In other scenarios, the loss in the diversity gain may be minimal due to the usage models and the nature of the UWB channels.

According to one feature, if channel conditions indicate that time and/or frequency spreading are unnecessary for transmissions, a transmitter may enter into a power-conservation mode of operation in which transmissions are performed using a time gating scheme or a time repetition scheme. In the time gating scheme, symbols are transmitted just once, rather than a plurality of times, but with increased transmission power. Thus, some of the transmitter chain components can be operated at a lower duty cycle or processing speed to conserve power. In the time repetition scheme, copies of the same symbol are transmitted a plurality of times on the same frequency on different symbol transmission periods. This is in contrast to an approach in which a symbol may be transmitted on the different frequencies on different symbol transmission periods. Consequently, the symbol can be generated just once and stored for subsequent retransmission, thereby allowing some of the transmitter chain components can be operated at a lower duty cycle or processing speed to conserve power.

According to another feature, a receiver may receive an indicator from a transmitter indicating a mode of symbol transmission. One mode of symbol transmission may be a power-conservation mode in which time and/or frequency diversity are sacrificed in favor of lower power consumption for the transmitter and/or receiver. The indicator may indicate, for example, a time gating scheme or a time repetition scheme. In the time gating scheme, a receiver receives a symbol just once but a higher transmission power than normal, allowing the some of the receiver chain components can be operated at a lower duty cycle or processing speed to conserve power. In the time repetition scheme, the copies of a symbol are received on different symbol transmission periods but on the same frequency. Therefore, the receiver can accumulate the copies of the symbol in a buffer or accumulator, thereby allowing some of the receiver chain components can be operated at a lower duty cycle or processing speed to conserve power while the copies of the symbol are being accumulated.

UWB Wireless Network

FIG. 1 is a conceptual illustration of an example of a wireless network in which a mobile access terminal implementing ultra wideband communications may operate. A wireless network 100 may include a plurality of mobile access terminals 104 and 106 that operate in an UWB spectrum. In various examples, the wireless network 100 may be a personal area network (PAN), a wide area network (WAN), etc. In one example, the mobile access terminals 104 and 106 may include a transceiver that operates in the ECMA 368 Ultra-Wideband (UWB) frequency spectrum, e.g., for Multiband Orthogonal Frequency Division Multiplexing (MB-OFDM). In some implementations, one or more of the access terminals may be adapted to provide multi-mode operation, where a terminal may communicate over a plurality of different types of communication interfaces. For instance, a multiple-access terminal may include one or more communication interfaces adapted to communicate over code division multiple access (CDMA) systems, time division multiple access (TDMA) systems, frequency division multiple access (FDMA) systems, and/or orthogonal frequency division multiple access (OFDMA) systems, and the like. Such communication interfaces may conform to specifications, such as, ECMA-368, third generation partnership project (3GPP), long-term evolution (LTE), etc. According to one feature, the access terminals 104 and/or 106 may include a low-power consumption UWB communication interface.

Introduction—UWB Network Example

Ultra wideband (UWB) may permit high-speed transmission of large amounts of data over a relatively broad range of frequency bands, using relatively low power, at a short range. UWB systems have a capacity proportional to their bandwidth and the logarithm of signal-to-noise ratio (SNR). UWB systems may utilize the signal spreading characteristic that a pulse signal widely spreads in the frequency domain when a very short pulse is transmitted in the time domain. Since trains of short duration pulses are spread to perform communications, UWB systems can shorten the pulse repetition period and lower the transmitted energy density per unit frequency to a level below the energy density for thermal noise. In UWB systems, transmission frequency bands may be determined according to the waveforms of pulses. UWB signal is a form of spread spectrum and hence provide a degree of protection against fading even in the presence of interference. UWB systems may be time-gated, hence may consume less power.

Figure 2:
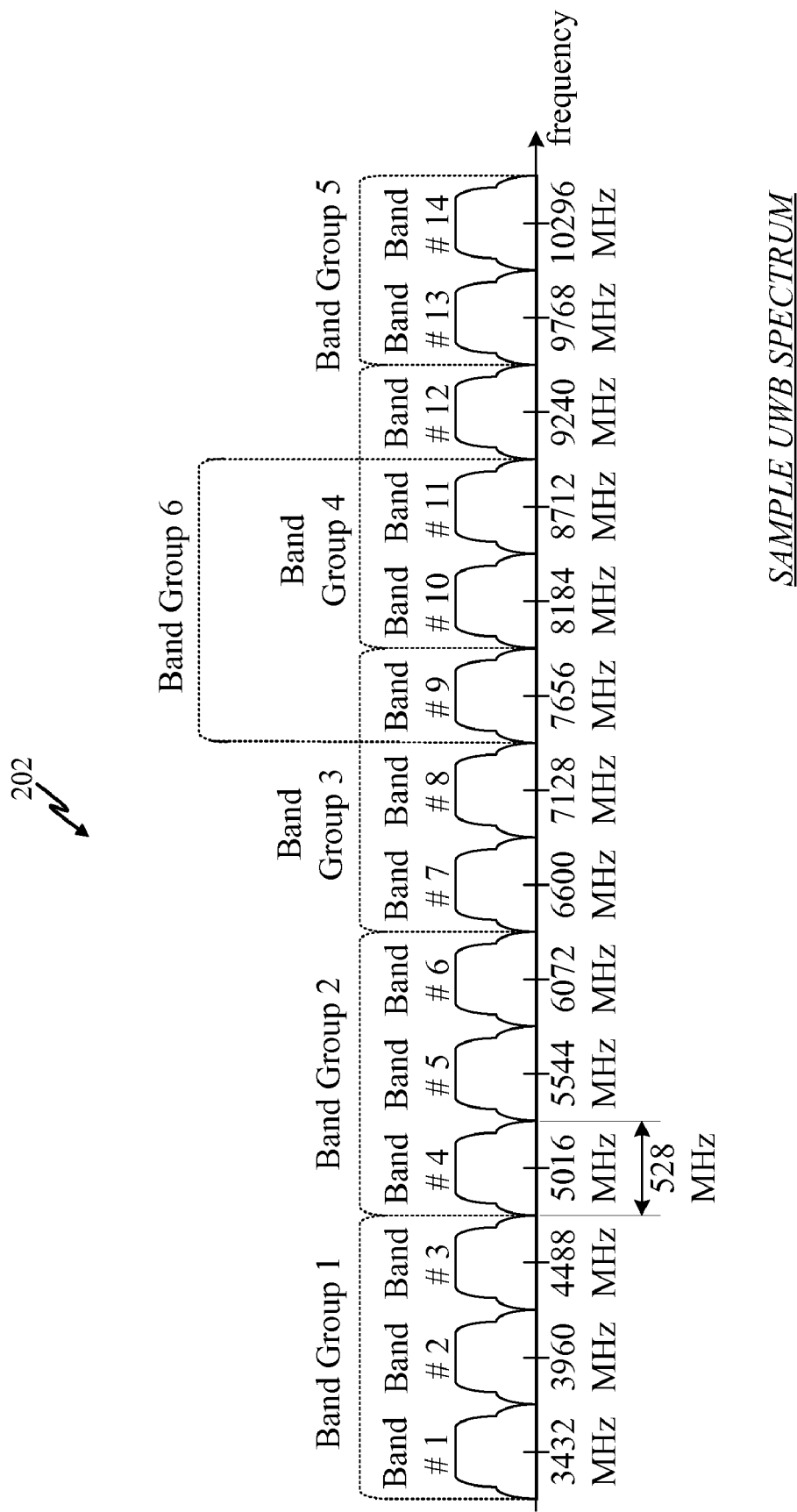
FIG. 2 illustrates an example of an ECMA 368 Ultra-Wideband (UWB) frequency spectrum for Multi-band Orthogonal Frequency Division Multiplexing (MB-OFDM).

FIG. 2 illustrates an example of an ECMA 368 Ultra-Wideband (UWB) frequency spectrum 202 for Multi-band Orthogonal Frequency Division Multiplexing (MB-OFDM). Ultra wideband (UWB) has become a solution for applications that benefit from relatively high bandwidth, such as wireless file transfer and video streaming. The ECMA-368 Standard specifies the ultra wideband (UWB) physical layer (PHY) for a wireless personal area network (PAN), utilizing the unlicensed 3,100-10,600 MHz frequency band, supporting data rates of 53.33 Mb/s, 80 Mb/s, 106.7 Mb/s, 160 Mb/s, 200 Mb/s, 320 Mb/s, 400 Mb/s, and 480 Mb/s.

In this example, the UWB spectrum 202 is divided into fourteen (14) bands, each 528 MHz wide, in the spectral range 3.1 GHz to 10.6 GHz. These bands may be further grouped into five band groups. For instance, the first twelve (12) bands may be then grouped into four (4) band groups consisting of three (3) bands, and the last two bands are grouped into a fifth band group. That is, Band Group #1 may include bands 1-3; Band Group #2 may include bands 4-6; Band Group #3 may include bands 7-9; Band Group #4 may include bands 10-12; and Band Group #5 may include bands 13-14. By having four adjacent groups of three bands, path loss at lower frequencies may be less than at higher frequencies, thus the lower bands may be preferred. Some hardware implementations of UWB physical layer (PHY) can use only one band group, (typically the lowest band Group #1), but other PHY implementations can use multiple band groups. The design of a PHY supporting multiple band groups may be simplified by the fact that Band Groups #1 through #5 all have the same bandwidth. Therefore, the PHY transmitter or receiver can tune to any of the first 4 band groups by simply changing a local oscillator frequency. Common filtering and processing before up conversion (at transmitter) or after down conversion (at receiver) may be applied to a 528 MHz wide band regardless of band group chosen thus reducing circuit complexity. In another embodiment, an additional band Group #6 may be defined containing bands 9, 10, and 11.

The ECMA-368 Standard specifies a Multi-Band Orthogonal Frequency Division Modulation (MB-OFDM) scheme to transmit information. A total of 110 sub-carriers (100 data carriers and 10 guard carriers) are used per band to transmit the information. In addition, 12 pilot subcarriers allow for coherent detection. Frequency-domain spreading (FDS), time-domain spreading (TDS), and forward error correction (FEC) coding are used to vary the data rates. The FEC used is a convolutional code with coding rates of ⅓, ½, ⅝ and ¾.

Coded bits may be aggregated into groups of 100 or 200 bits each. Pairs of bits within a group may be modulated, using known modulation techniques such as quadrature phase shift keying (QPSK), onto data tones, typically 100, generally equally spaced in one of the 528 MHz bands. Symbols associated with a unique piconet may be assigned a specific one of the 6 band groups, and may be further assigned a unique time-frequency code within the assigned band group. The band assigned for successive symbols may either change with time or remains constant according to a time frequency code.

Unique logical channels may be defined by using up to ten different time-frequency codes (TFC) for each band group. Time-frequency codes may be hopping patterns used by the ECMA 368 signal. In one example, there may be three types of patterns. The first type may be Time-Frequency Interleaved (TFI), and may include signals that hop in various patterns among the three frequency bands in the band group. The second type where the coded is interleaved over two bands in the same band group and is referred to as two-band TFI or TFI2. The third type may be called Fixed-Frequency Interleaved (FFI), in which the signal may not hop but stays in one frequency band. The length of the TFC code may be n symbols (where n is an integer value), so it is repeated at least several times during a packet.

FIG. 3 is a chart 302 illustrating example of the time-frequency code (TFC) patterns for ten TF codes which spread data symbols over all available bands in a band group. The code patterns may determine which of the three (3) (or 2 in the case of Band Group #5) available bands in a band group may be used for successive data symbols from a given piconet. For example, given Band Group #1 and examining TFC 1, data symbols may be transmitted sequentially in band 1, band 2, band 3, band 1, band 2, band 3, repeating indefinitely. The same TFC 1 used in band group 2 may transmit data sequentially in band 4, band 5, band 6, band 4, band 5, band 6, repeating indefinitely. Each network may be assigned one of the band groups and a unique TFC within that band group.

FIG. 4 is a chart 402 illustrating an example of the PHY layer channelization scheme of the TFCs of FIG. 3. The chart 402 shows the mapping of the medium access control (MAC) Channel Number to PHY Band Group and TF Code as well as the TFCs and corresponding repeating sequence of band numbers for successive data symbols, each TFC may be non-varying as a function of time. Unique logical channels may be defined by using up to 10 different TFC codes for each band group. The channel number may take on values from 0-255 (decimals).

In one embodiment, channel numbers 9-15 may be mandatory. Channels using TFCs 1-4 may be time-frequency interleaved (TFI) channels, as described above, and those using TFCs 5-7 may be fixed-frequency interleaved (FFI) channels, described above. As a result of the large number of channels that the acquiring device may need to search through in order to find the correct TFC, UWB initial acquisition may be very slow.

Figure 5:
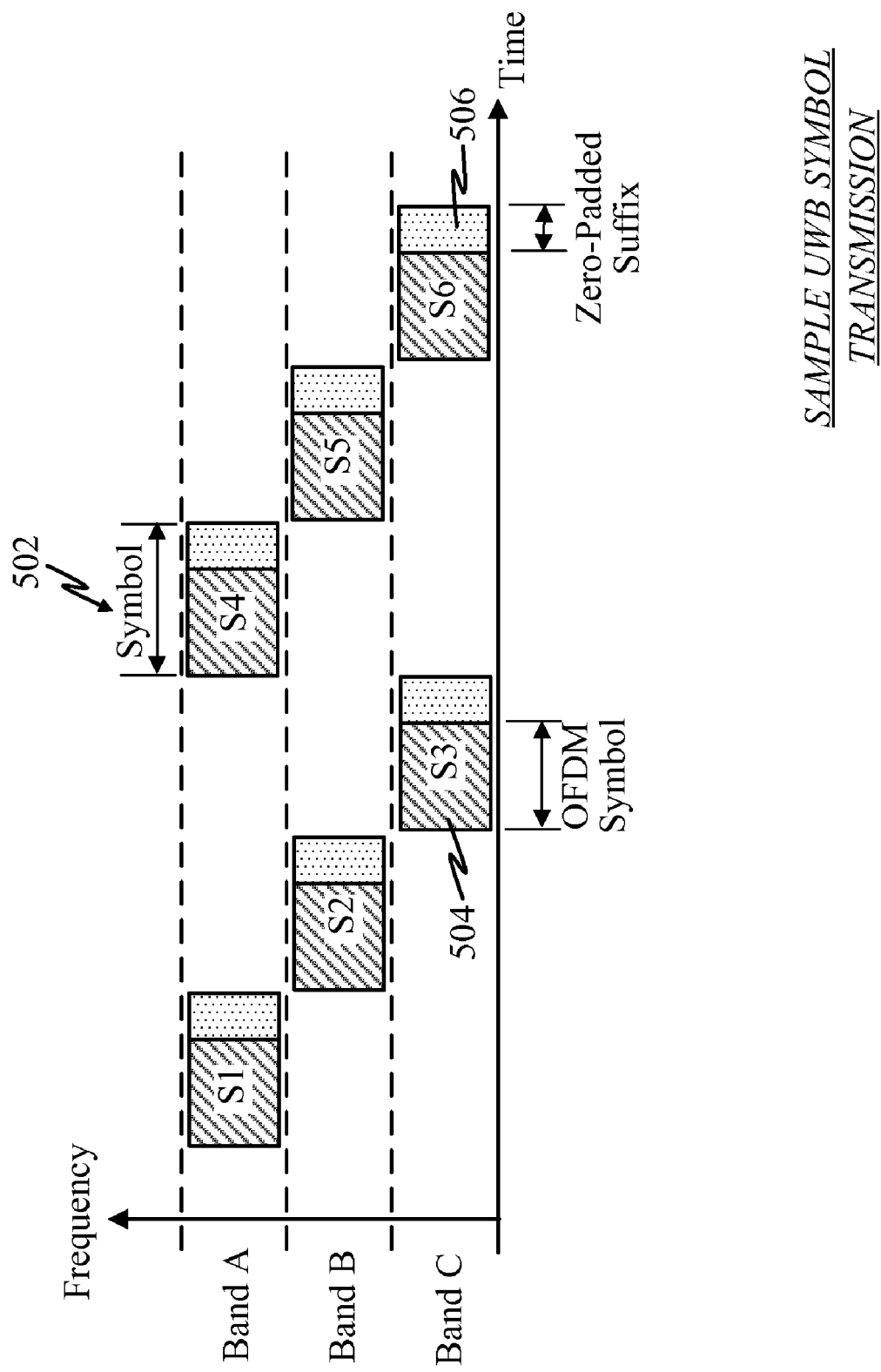
FIG. 5 illustrates an example of how a plurality of symbols may be transmitted by a UWB compliant device.

FIG. 5 illustrates an example of how a plurality of symbols may be transmitted by a UWB compliant device. Each symbol 502 may include an OFDM symbol portion 504 and a Zero-Padded Suffix portion 506. The symbols may be transmitted using a over a plurality of frequencies according to a time-frequency code (e.g., illustrated in FIGS. 3 and 4). In this example, three frequency bands (Band A, Band B, and Band C) are used for symbol transmissions, where a first symbol S1 is transmitted at a center frequency for a first band Band A, the second symbol S2 is transmitted over a second band Band B, the third symbol S3 is transmitted over a third band Band C, the fourth symbol S4 is transmitted over the first band Band A, the fifth symbol S5 is transmitted over the second band Band B, the sixth symbol S6 is transmitted over the third band Band C, and so on. For instance, if TFC #1 in FIG. 3 is used for transmissions, Band A is Band #1 (FIG. 2), Band B is Band #2 (FIG. 2), and Band C is Band #3 (FIG. 2).

Figure 6:
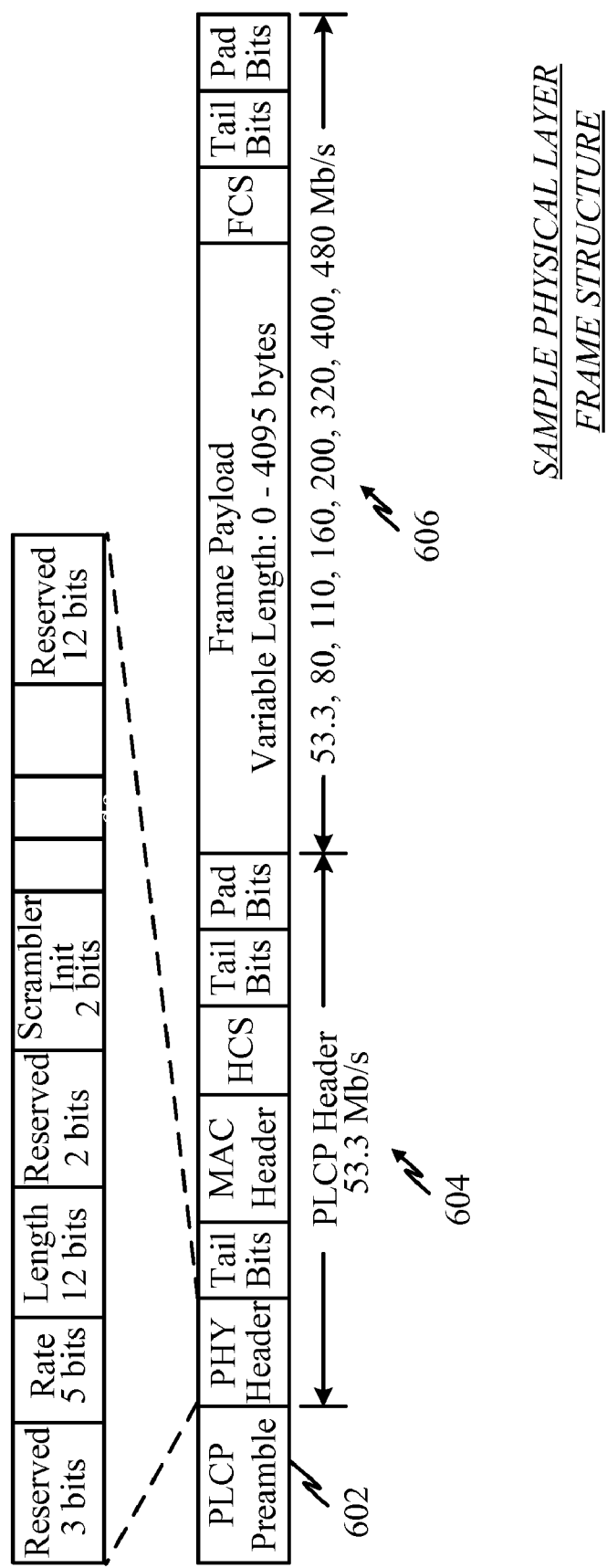
FIG. 6 illustrates an example of a physical layer (PHY) frame structure of a UWB communication network.

FIG. 6 illustrates an example of a physical layer (PHY) frame structure of a UWB communication network. As described above, a physical layer convergence protocol (PLCP) may provide a method to convert a service data unit (SDU) into a protocol data unit (PDU). The PLCP PDU (PPDU) may comprise three components: the PLCP preamble 602, the PLCP header 604 and the PLCP SDU (PSDU) 606. The PLCP header 604 may comprise a physical header ("PHY header"), tail bits or tails symbols ("TS"), a media access control header ("MAC header"), a header check sequence ("HCS"), and pad bits or stuff bits ("SB"). The PSDU 606 may comprise the frame payload, a data SNR+ frame check sequence ("FCS"), tail bits or tail symbols ("TS") and pad bits or stuff bits ("SB").

The preamble 602 may comprise two portions, a time-domain portion for packet/frame synchronization followed by a frequency domain portion for channel estimation. The preamble 602 may be used for synchronization during a transmitting/receiving process, carrier offset compensation and equalization of received signals. A unique preamble sequence may be assigned to each TFC. The PHY header may be used to show information, such as a scrambling code, data rate of an MAC frame and data length. The MAC header may be used to show a frame adjusting signal, a network identifier ("PNID"), a destination identifier ("DestID"), a source identifier ("SrcID"), fragmentation control information and stream index information.

The HCS may be used to detect errors occurring in the PHY header and the MAC header. In the data+FCS, a data field may be used to transmit data with its encryption data. The FCS field may be used for error detection in the data which is being transmitted. Bits in the SB may be a type of dummy bits inserted to generate the data+FCS in a size that may be an integer multiple of the symbol size applied to the desired data rate. As a result, when the size of the data+FCS is an integer multiple of the symbol size applied to the desired data rate, the SB may not need to be inserted.

FIG. 7 is a table illustrating an example of modulation parameters for an ECMA 368 compliant transceiver. In this example, it can be observed that for data rates 53.33 and 80 Mbps both time and frequency spreading is used, while for data rates 106.7, 160 and 200 Mbps only time spreading is used. Frequency-domain spreading (FDS), time-domain spreading (TDS), and forward error correction (FEC) coding are used to vary the data rates. The FEC used is a convolutional code with coding rates of ⅓, ½, ⅝ and ¾. For data rates of 200 Mb/s and lower, the binary data is mapped onto a QPSK constellation. For data rates of 320 Mb/s and higher, the binary data shall be mapped onto a multi-dimensional constellation using a dual-carrier modulation (DCM) technique.

The coded data may be spread using a time-frequency code (TFC), as illustrated in FIGS. 3 and 4. The ECMA-368 Standard specifies two types of time-frequency codes (TFCs): one where the coded information is interleaved over three bands, referred to as Time-Frequency Interleaving (TFI); and, one where the coded information is transmitted on a single band, referred to as Fixed Frequency Interleaving (FFI). Within each of the first four band groups, four time-frequency codes using TFI and three time frequency codes using FFI are defined; thereby, providing support for up to seven channels per band. For the fifth band group, two time-frequency codes using FFI are defined. This ECMA-368 Standard specifies 30 channels in total.

Frequency Spreading—Principle

Figure 8:
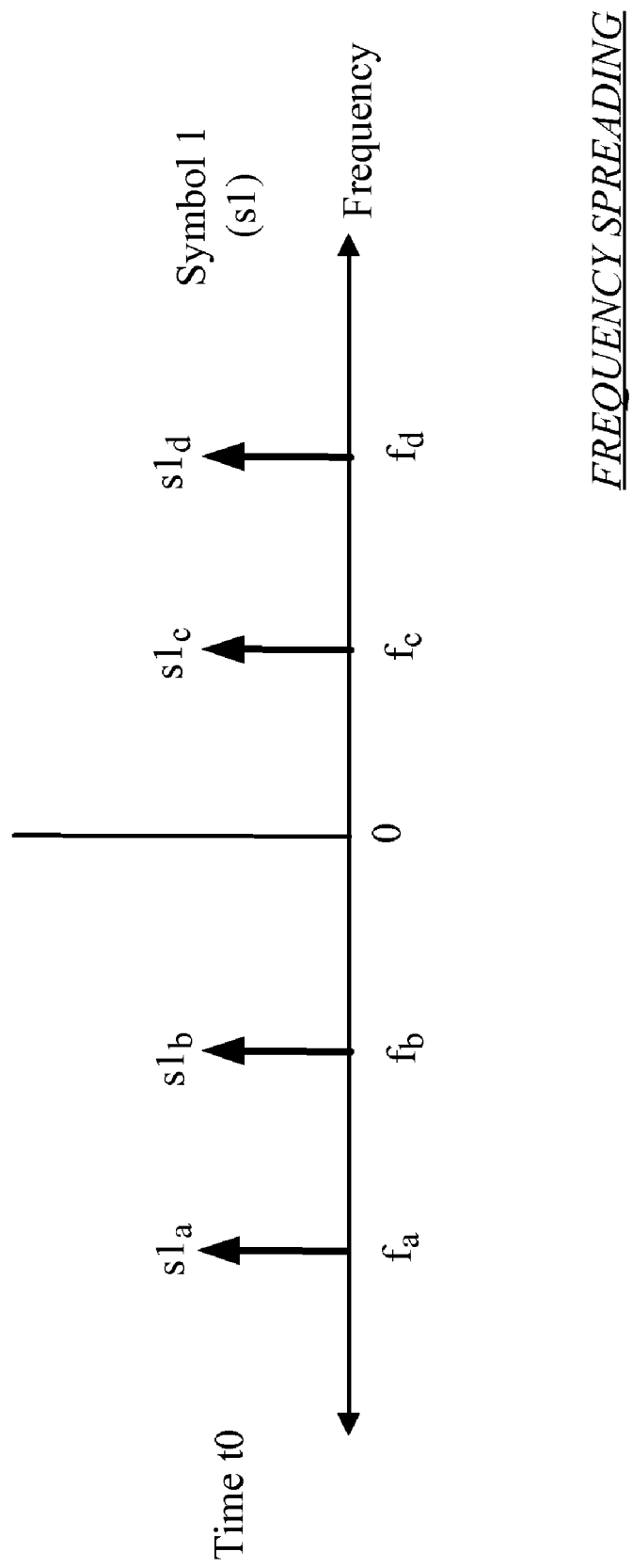
FIG. 8 is a diagram illustrating how a symbol may be spread across a plurality of frequencies.

FIG. 8 is a diagram illustrating how a symbol may be spread across a plurality of frequencies. In order to make transmissions less susceptible to noise and interference, frequency spreading may be employed in which a symbol is repeated across a plurality of frequencies for transmission. For instance, in FIG. 8 a symbol s1 is transmitted at time t0 (or a given transmission time slot) over frequencies (or frequency bands) $f_a$, $f_b$, $f_c$, and $f_d$. That is, a first version $s1_a$ of the symbol s1 is transmitted on a first frequency $f_a$, a second version $s1_b$ of the symbol s1 is transmitted on a second frequency $f_b$, a third version $s1_c$ of the symbol s1 is transmitted on a third frequency $f_c$, and a fourth version $s1_d$ of the symbol s1 is transmitted on a fourth frequency $f_d$. Such frequency spreading may occur within a frequency band (e.g., Bands 1, 2, 3 ... 14 of FIG. 2) and/or across a plurality of frequency bands within a band group (e.g., Band Groups 1, 2 ... 6, of FIG. 3). Note that, as contemplated herein, "frequency spreading" may include other schemes, including frequency spreading schemes for OFDM transmission systems.

While frequency spreading helps improve spectrum diversity for each transmitted symbol, it also means that a symbol is transmitted a plurality of times, resulting in more power consumption for the transmitter device. Likewise, the receiver device may consume more power as it has to receive and demodulate the same symbol a plurality of times.

Figure 12:
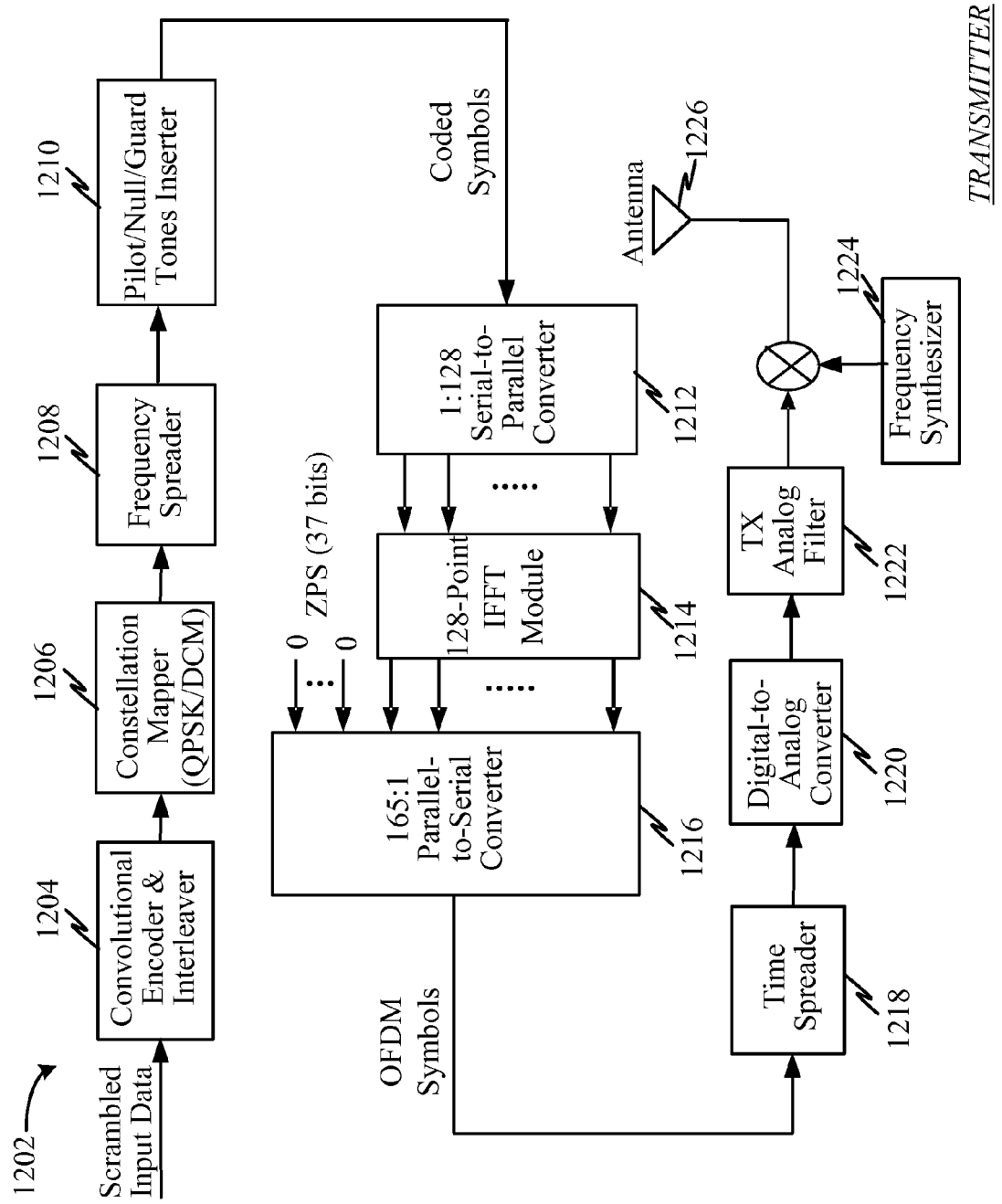
FIG. 12 is a block diagram illustrating a more detailed example of a transmitter device.

In one example, such frequency spreading may be implemented by a frequency spreader 1208 of the transmitter 1202 of FIG. 12. Likewise, frequency de-spreading may be implemented by a frequency de-spreader 2134 of the receiver of FIG. 21.

In the ECMA 368 standard, frequency spreading is implemented where a coded bit or symbol is concurrently sent on four different tones (e.g., frequencies or frequency bands) for data rates 53.33 and 80 Mbps. Similarly, the same coded bit or symbol is sent concurrently two different tones for data rates 106.7, 160, and 200 Mbps.

According to one feature, under certain circumstances, frequency spreading may be switched Off so as to conserve power at the transmitter and/or receiver. This also allows cycling certain transmitter/receiver components to further conserve power.

Time Spreading—Principle

Figure 9:
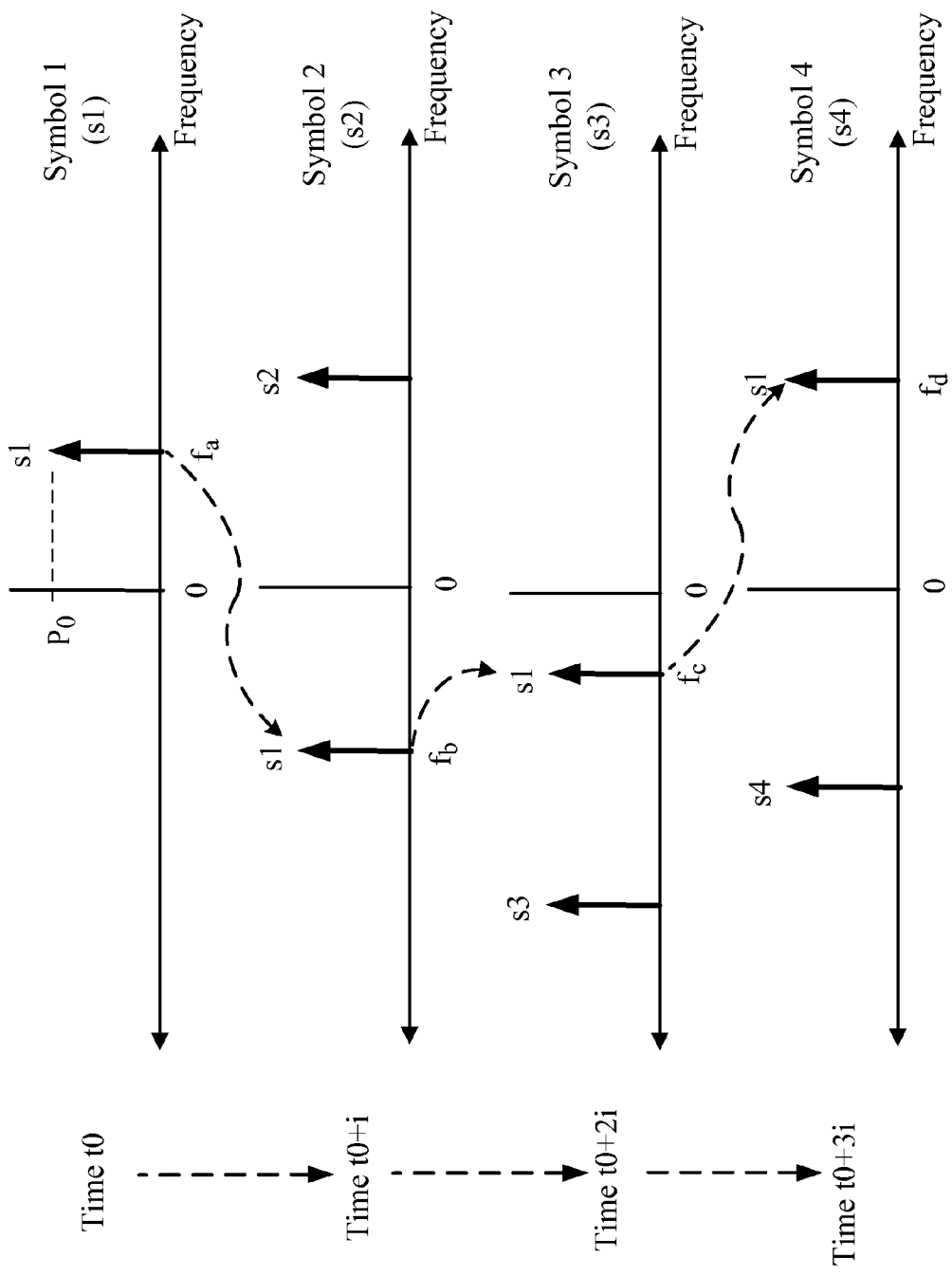
FIG. 9 is a diagram illustrating how a symbol may be spread across time.

FIG. 9 is a diagram illustrating how a symbol may be spread across time. In order to make transmissions less susceptible to noise and interference, frequency spreading may be employed in which a symbol is repeated at different transmission times and at different frequencies (or frequency bands). For instance, at time t0, a first symbol s1 is transmitted. Then, at a later time t0+i when a second symbol s2 is being transmitted, the first symbol s1 is again transmitted but at a second frequency $f_b$. At a later time t0+2i when a third symbol s3 is being transmitted, the first symbol s1 is again transmitted but at a third frequency $f_c$. Similarly, at a later time t0+3i when a fourth symbol s4 is being transmitted, the first symbol s1 is again transmitted but at a fourth frequency $f_d$. In this example, the symbol s1 is transmitted using a transmit power $P_0$. While time spreading helps improve spectrum diversity for each transmitted symbol, it also means that a symbol is transmitted a plurality of times, resulting in more power consumption for the transmitter device. Likewise, the receiver device may consume more power as it has to receive and demodulate the same symbol a plurality of times.

In the ECMA 368 standard, time spreading is implemented where a coded bit or symbol is sent four times (e.g., on different frequencies or frequency bands) for data rates 53.33 and 80 Mbps. Similarly, the same coded bit or symbol is sent two times for data rates 106.7, 160, and 200 Mbps.

According to one feature, under certain circumstances, time spreading may be switched off so as to conserve power at the transmitter and/or receiver. This also allows cycling certain transmitter/receiver components to further conserve power.

Note that the symbols illustrated in FIGS. 8 and 9 may be OFDM symbols that can be represented as complex symbols having a real and imaginary components. Such details are omitted for simplicity purposes.

Also note that where both frequency and time spreading are implemented in the ECMA 368 Standard, a coded bit or symbol may be sent four times on four different tones for data rates 53.33 and 80 Mbps and twice on two different tones for data rates 106.7, 160 and 200 Mbps.

Example Access Terminal

Figure 10:
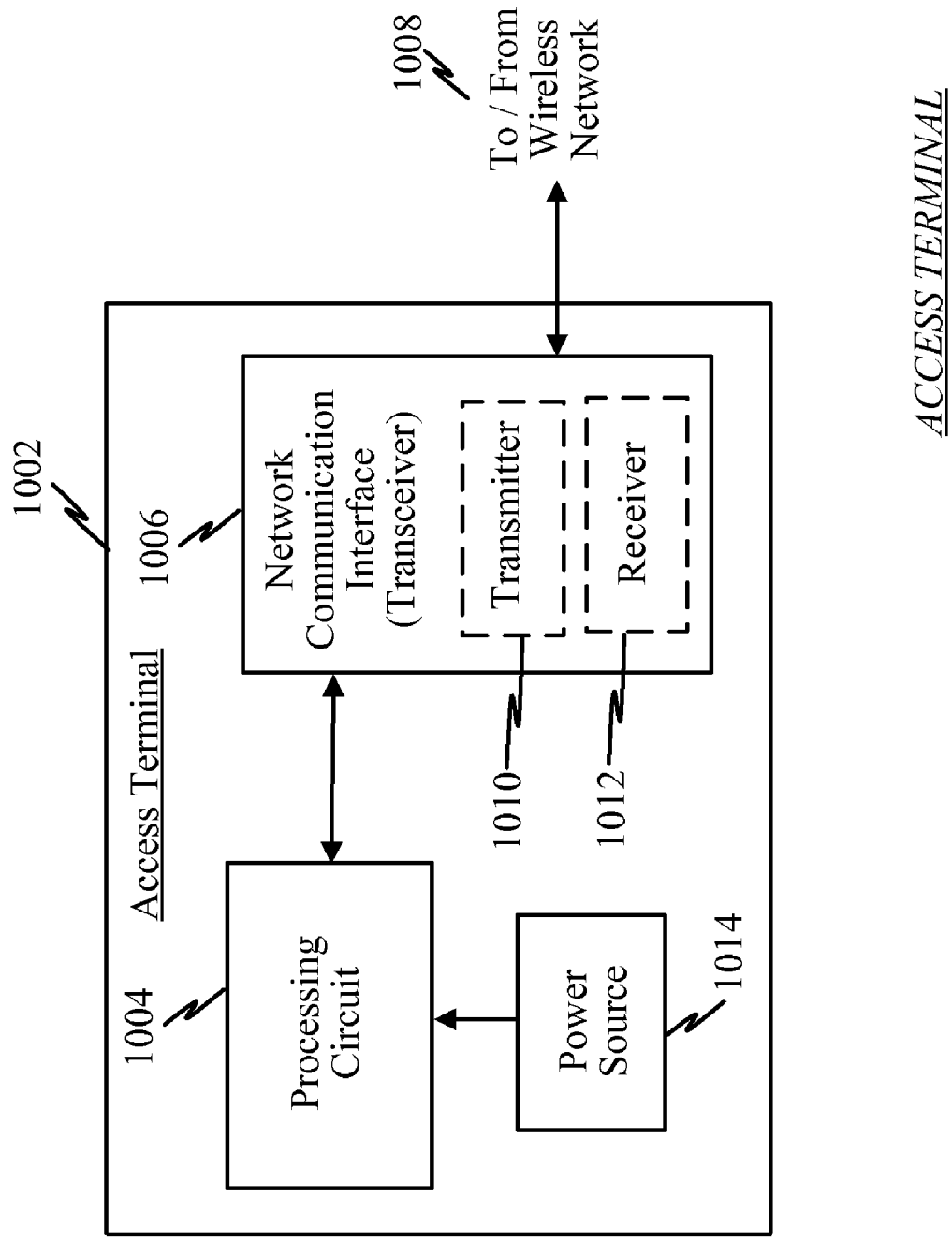
FIG. 10 is a block diagram of an access terminal having a low-power consumption UWB communication interface.

FIG. 10 is a block diagram of an access terminal having a low-power consumption UWB communication interface. In this example, the access terminal 1002 may include a processing circuit 1004 communicatively coupled to a network communication interface 1006 through with the access terminal 1002 can communicate with a wireless network 1008. The network communication interface 1006 maybe a transceiver that includes a transmitter 1010 and/or a receiver 1012 that are adapted to communicate over a UWB wireless network. In some embodiments, the access terminal 1002 may also include additional network communication interfaces that are adapted to communicate over different types of wireless networks. According to various examples, the access terminal 1002 may be a mobile device, mobile phone, wireless terminal, personal communication device, a mobile computing device, a mobile digital media player, and/or other types of mobile or fixed communication devices.

The access terminal 1002 may be powered by a power source 1014, e.g., rechargeable battery. In order to extend the operating life of the power source, e.g., extend operating time in between recharges, the network communication interface 1006 may include one or more features to reduce power consumption for UWB transmissions/reception.

Low-Power Transmitter

Figure 11:
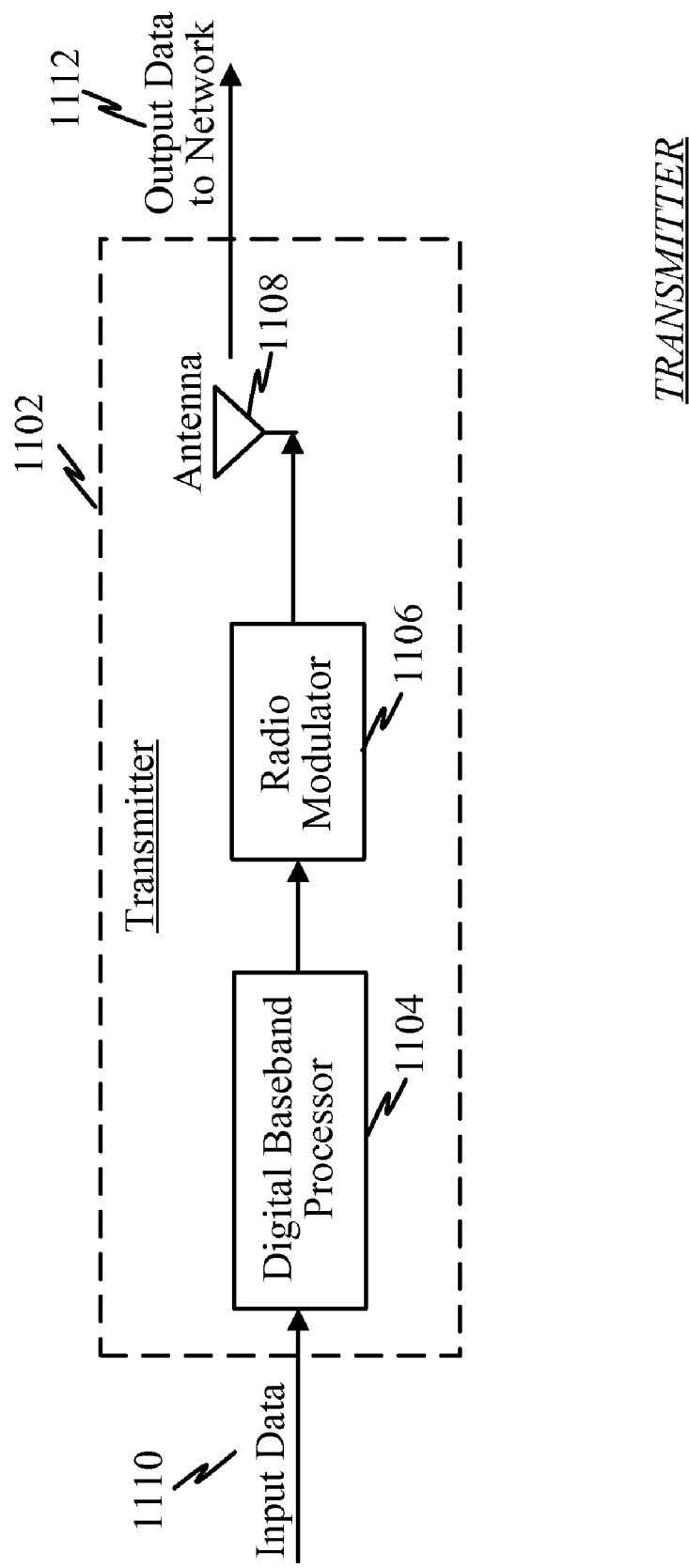
FIG. 11 is a block diagram illustrating an example of a wireless transmitter that may be adapted for low-power consumption.

FIG. 11 is a block diagram illustrating an example of a wireless transmitter that may be adapted for low-power consumption. The transmitter 1102 may include a digital baseband processor 1104 that processes input data 1110. A radio modulator 1106 may receive the processed input data from the digital baseband processor 1104 and modulates it into output data for wireless transmission over an antenna 1108. The antenna 1108 may transmit the output data 1112 over a wireless network (e.g., a UWB network).

FIG. 12 is a block diagram illustrating a more detailed example of a transmitter device. In one example, one or more of the components illustrated in FIG. 12 may be part of the baseband processor 1104 and/or radio modulator 1106 of FIG. 11.

In the transmitter 1202, scrambled input data (e.g., data for transmission) is passed from a convolutional encoder and interleaver 1204, to a constellation mapper 1206, to a frequency spreader 1208 (which spreads the data in the frequency domain) and to a pilot/null/guard tone inserter 1210 to generate a coded symbol stream.

A serial-to-parallel converter 1212 then converts the coded symbol stream to a plurality of parallel streams that are processed by an inverse Fast Fourier Transform (IFFT) module 1214 to convert the coded symbols from the time domain to the frequency domain. A parallel-to-serial converter 1216 then converts the parallel data streams to a serial data stream of OFDM symbols. Note that, in this example, a zero padded suffix (ZPS) is appended to the OFDM symbol. The ZPS may be 37 bits long and appended to the 128 point data to obtain a total of 165 bits which are converted by the parallel-to-serial converter 1216. A time spreader 1218 then spreads the serial data in the time domain and a digital-to-analog converter 1120 converts the data into one or more analog signals. A transmitter analog filter 1122 is used to remove extraneous frequencies and the resulting analog signal is modulated by a transmit frequency from a frequency synthesizer 1124 for transmission over an antenna 1126.

Under typical operation, the frequency spreader 1208 is repeating the same symbol a plurality of times (repetition) across different frequencies. For instance, in the ECMA 368 Standard, a coded bit or symbol is sent four times on four different tones for data rates 53.33 and 80 Mbps and twice on two different tones for data rates 106.7, 160 and 200 Mbps. This causes the IFFT Module 1214 and digital-to-analog converter 1220 to operate very fast and consume a lot of power. Likewise, in the modes where the time spreader 1218 is operational, it causes the same symbol to be repeated at different times, causing additional power consumption to the transmitter and receiver devices.

Under certain circumstances, it is possible to reduce the power consumption of the transmitter 1202 by trading off frequency diversity and/or time diversity. That is, rather than operating the transmitter 1202 in a conventional manner (e.g., having full frequency and/or time diversity), the frequency and/or time spreading may be reduced or eliminated (under certain circumstances) to lower power consumption. For example, in situations where channel conditions are relatively good (e.g., a minimum level of signal strength is present and/or noise or interference is below a threshold level), the use of frequency and/or time spreading is wasteful of the limited power resources. Consequently, one feature provides for modifying the operation of the transmitter (and receiver) if it is determined that the communication channel has interference and/or noise below a particular threshold. Under such circumstances, frequency and/or time spreading may be eliminated or reduced without significantly impacting transmissions (e.g., without impacting the data transmission rate).

Two approaches, referred to as time gating and symbol repetition, are described below which may result in reduced power consumption by a transmitter (and receiver) when channel conditions allow eliminating and/or reducing frequency and/or time diversity (spreading). This power conservation may be achieved while still maintaining the same effective data transmission rate from a transmitter to a receiver.

According to an example of time gating operational on a transmitter, the frequency spreader 1208 and/or time spreader 1218 may be turned Off or non-operational (not cycled) while the DAC 1220, TX analog filter 1222, the frequency synthesizer 1224, and/or the antenna 1226 may be cycled Off/On. Meanwhile, the Pilot/Null/Guard Tones inserter 1210, the serial-to-parallel converter 1212, the IFFT module 1214, and/or the parallel-to-serial converter 1216 may be operated at a lower speed or cycled Off/On (e.g., lower duty cycle). In some instances, the preferred approach may be to operate these devices at a lower speed.

According to an example of time repetition operational on a transmitter, the frequency spreader 1208 and/or time spreader 1218 may be turned Off or non-operational (not cycled). Meanwhile, the Pilot/Null/Guard Tones inserter 1210, the serial-to-parallel converter 1212, the IFFT module 1214, and/or the parallel-to-serial converter 1216 may be cycled Off/On (e.g., changing the duty cycle) or operated at a lower speed. In some instances, the preferred approach may be to operate these devices at a lower speed.

Time Gating—Alternative to Time Spreading

According to a first feature, instead of sending a symbol a plurality of times (e.g., two or four times), the symbol is sent just once using more power. That is, in the ECMA-368 Standard, one symbol (or coded bit) may be sent four times on four different tones for data rates 53.33 and 80 Mbps and twice on two different tones for data rates 106.7, 160 and 200 Mbps.

Figure 13:
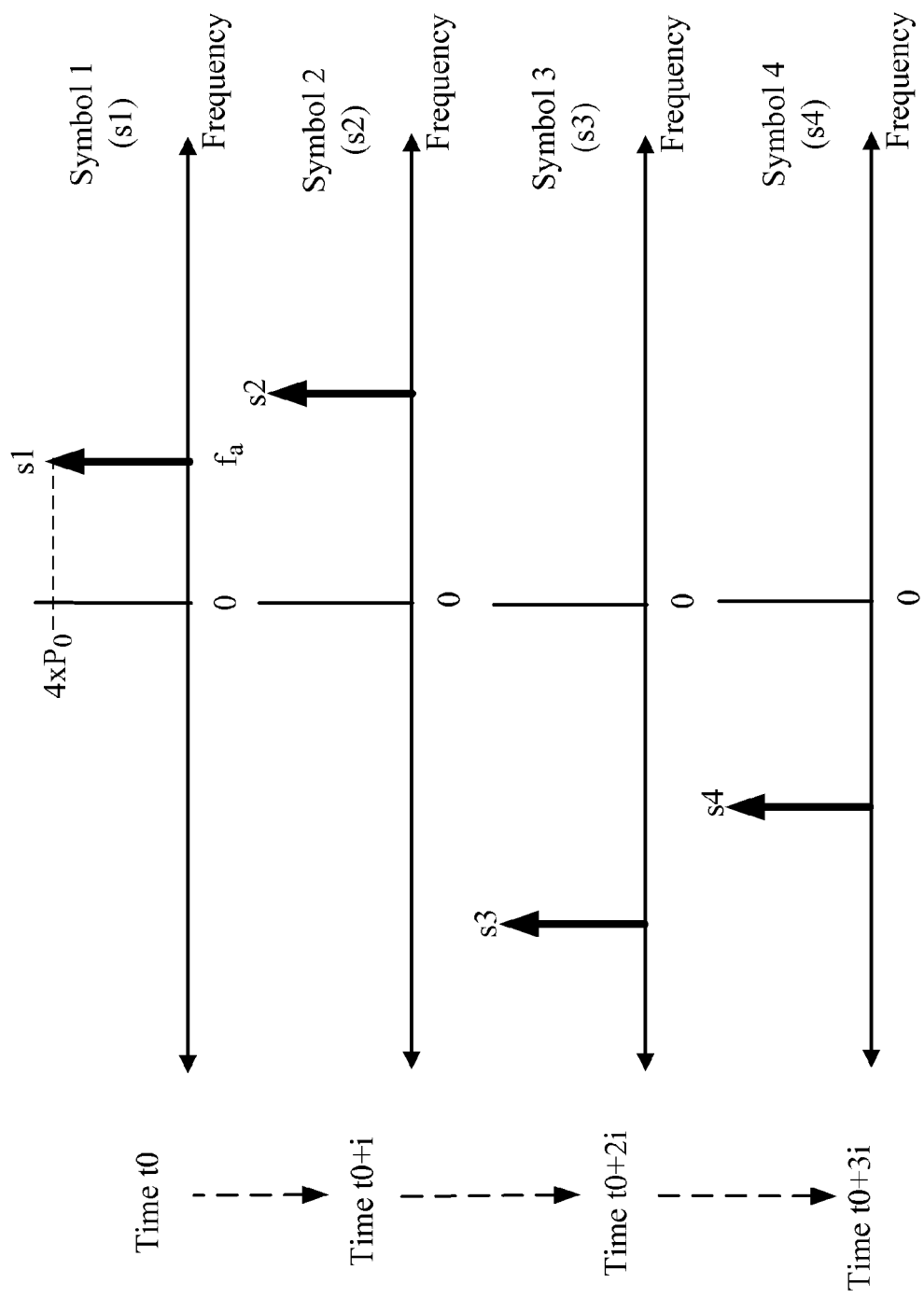
FIG. 13 illustrates an example of how a symbol is sent just once, rather than a plurality of times, but at a higher transmission power.

FIG. 13 illustrates an example of how a symbol is sent just once, rather than a plurality of times, but at a higher transmission power. In comparison to FIG. 9, where symbol s1 is sent at four different times and frequencies, in this approach the symbol s1 is sent just once but with more power. Consequently, the symbol s1 is not retransmitted on subsequent time periods t0+i, t0+2i, and t0+3i (as in FIG. 9) but instead is transmitted only once (during the time period t0). According to one implementation, the increase in transmission power is proportional to the number of times the symbol would have been repeated. For example, in the ECMA-368 standard the symbol s1 may be sent four times at with a transmission power $P_0$. However, according to the alternative approach herein described, the same symbol s1 is sent just once but at four times the power $P_0$ (or $4 \times P_0$). Unlike the conventional approach, the symbol s1 is not repeated in subsequent transmission time slots.

For a transmitter compliant with the ECMA 368 standard, for data rates 53.33 and 80 Mbps the symbol is transmitted just once (instead of four times) at four times the original power. Similarly, for data rates 106.7, 160, and 200 Mbps the symbol is sent only once (instead of two times) at twice the original power.

Since the symbol s1 is transmitted just once (rather than multiple times), several transmitter components may be cycled Off during those times when it is no longer being transmitted. For instance, in FIG. 12, the IFFT module 1214 and/or the components (e.g., digital-to-analog converter 1220, TX analog filter 1222, etc.) after the IFFT module 1214 in the transmitter chain may be turned Off.

Figure 14:
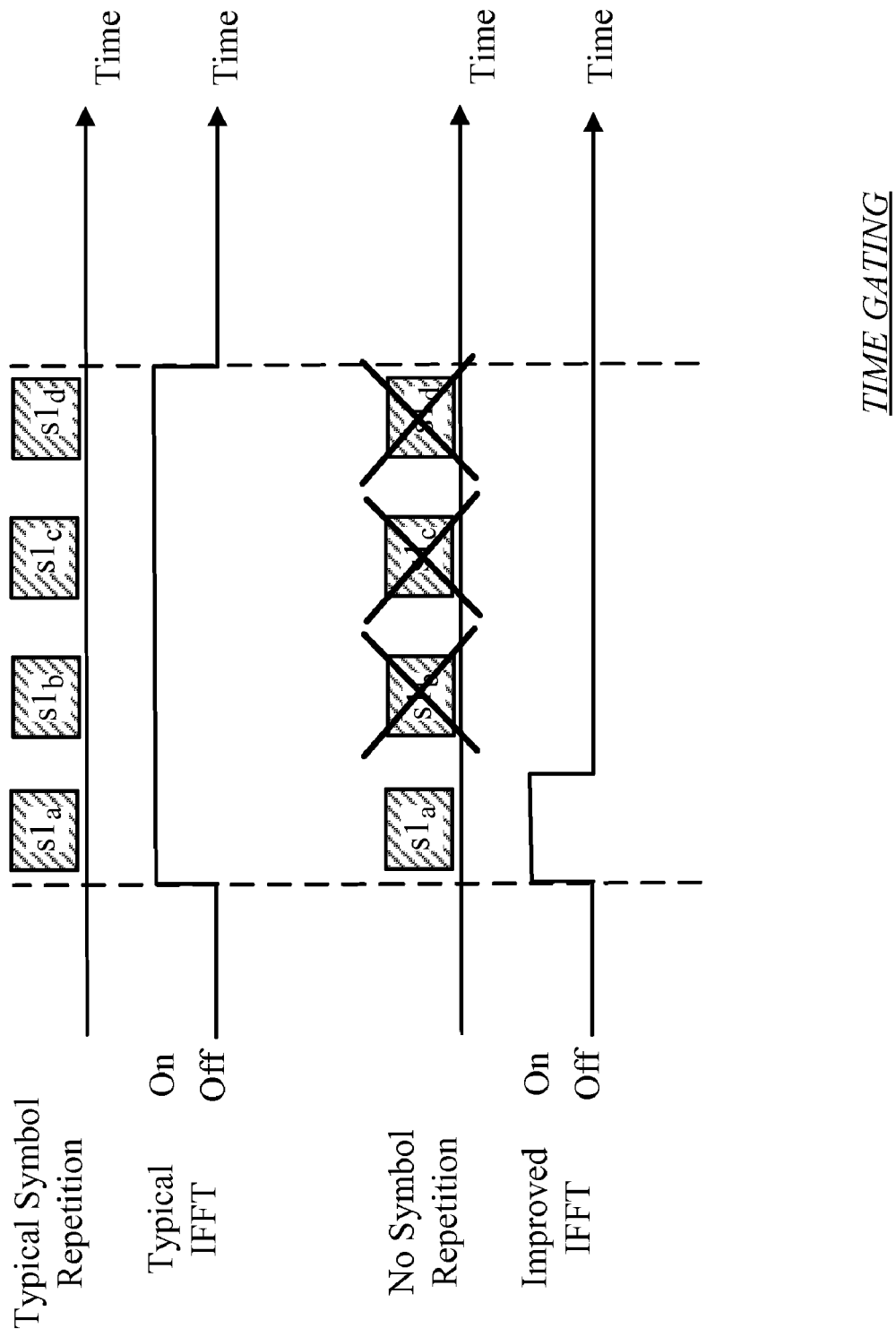
FIG. 14 illustrates how time gating may achieve power reduction by turning off components of transmitter chain when implementing time gating.

FIG. 14 illustrates how time gating may achieve power reduction by turning off components of transmitter chain when implementing time gating. In the typical approach, a symbol s1 is transmitted four times (shown as $s1_a$, $s1_b$, $s1_c$, $s1_d$) at different times. However, by transmitting the symbol s1 with no repetition but with greater power, some transmitter chain components (such as the IFFT module 1214, parallel-to-serial converter 1216, time spreader 1218, digital-to-analog converter 1220, and TX analog filter 1222) may be cycled Off.

According to one approach, the IFFT module 1214 may run at the same speed as before but may be cycled On/Off so as to conserve power during times when the symbol is not longer being transmitted. For example, for the ECMA 368 standard, at data rates 53.33 and 80 Mbps (where a symbol is typically transmitted four different times), the IFFT module 1214 may only be turned On one fourth of the time (as illustrated in FIG. 14) during which the symbol is transmitted just once at four times the original power. That is, the IFFT module 1214 is On for one symbol transmission and Off for the following three symbol transmissions. Similarly, at data rates 106.7, 160, and 200 Mbps (where a symbol is typically transmitted two different times), the IFFT module 1214 may be turned On half of the time during which the symbol is transmitted just once at twice the original power. That is, the IFFT module 1214 is On for one symbol transmission and Off for the next symbol transmission.

According to a second approach, the IFFT module 1214 may run at a slower speed than the conventional implementation to conserve power. For example, for the ECMA 368 standard, at data rates 53.33 and 80 Mbps (where a symbol is typically transmitted four different times within a time period), the IFFT module 1214 may run at one fourth the original speed for the entire time period to transmit a symbol just once. That is, the IFFT module 1214 is On for the entire time period but is run at only one quarter the original speed, thereby conserving power. Similarly, at data rates 106.7, 160, and 200 Mbps (where a symbol is typically transmitted two different times within a time period), the IFFT module 1214 may be run at half its original speed for the entire time period to transmit a symbol just once. That is, the IFFT module 1214 is On for the entire time period but is run at only half the original speed, thereby conserving power.

Time Repetition—Alternative to Frequency Spreading

According to a second feature, instead of sending a symbol a plurality of times but on different frequencies (as in frequency spreading of FIG. 8), the symbol is sent on the same frequency or tone each time. In the ECMA-368 Standard, one symbol (or coded bit) is sent four times on four different tones for data rates 53.33 and 80 Mbps and twice on two different tones for data rates 106.7, 160 and 200 Mbps. Thus, each time the symbol is to be sent, it is modulated into a different frequency or tone (as illustrated in FIGS. 8 and 9). In the present approach, the symbol is modulated into frequency just once (at a first frequency or tone), stored, and sent a plurality of times. By storing the symbol, the IFFT module 1214 can avoid generating the symbol each time. Consequently, either the duty cycle or the processing speed of the IFFT module 1214 can be reduced, thereby conserving power. Additionally, the Frequency Spreader module 1208 and/or Time Spreading module 1218 are turned Off.

Figure 15:
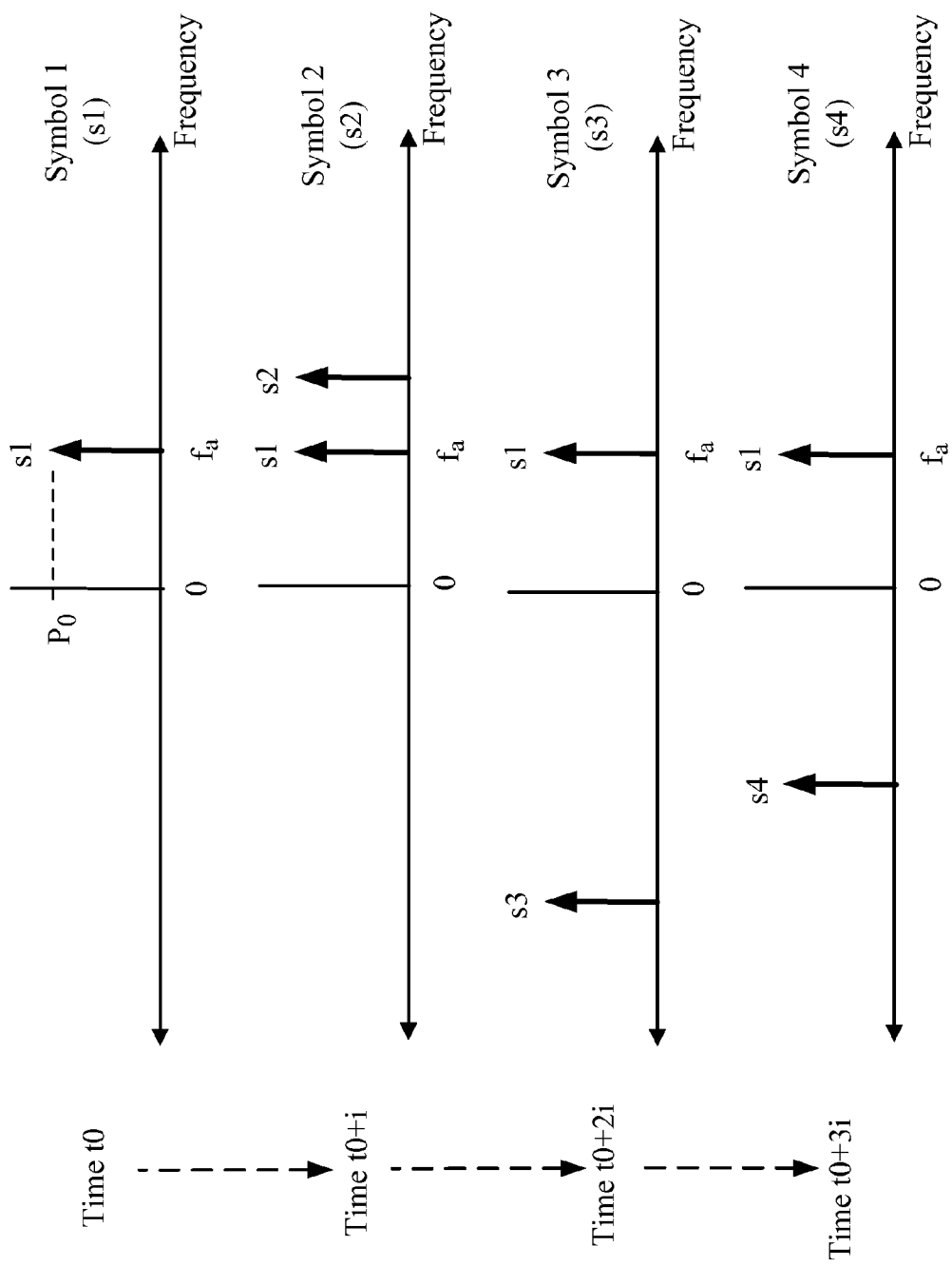
FIG. 15 illustrates how the same first symbol is transmitted on the same frequency a plurality of times instead of using different frequencies.

FIG. 15 illustrates how the same first symbol s1 is transmitted on the same frequency $f_a$ a plurality of times instead of using different frequencies. In this example, the first symbol is transmitted just once during the time periods t0, t0+i, t0+2i, and t0+3i and on the same frequency $f_a$.

In this approach, one symbol (e.g., OFDM symbol) is generated by a digital baseband module at the transmitter and the output of the IFFT is stored while it is processed by the analog and RF components to be transmitted at time t0 as the current symbol. Then, the stored output of the IFFT (e.g., the stored symbol) is repeatedly processed in the same way by the analog and RF components to be transmitted in subsequent transmission periods. For instance, for data rates of 53.33 and 80 Mbps, the stored symbol is transmitted three more times. For data rates of 106.7, 160, and 200 Mbps, the stored symbol is transmitted one more time. Therefore, the frequency spreader 1208 and IFFT module 1214 may be turned Off for three symbol periods for 53.33 and 80 Mbps and one symbol period for 106.7, 160 and 200 Mbps. Another option is for the IFFT module 1214 to run at one fourth of the speed for data rates 53.33 and 80 Mbps and half of the speed for data rates 106.7, 160 and 200 Mbps.

In one example, the time gating and time repetition schemes described herein are exclusive of each other such that they may not be concurrently executed. Note that, these techniques may co-exist within a transmitter or receiver but only one may be implemented at any one moment.

Example Low-Power Transmitter

Figure 16:
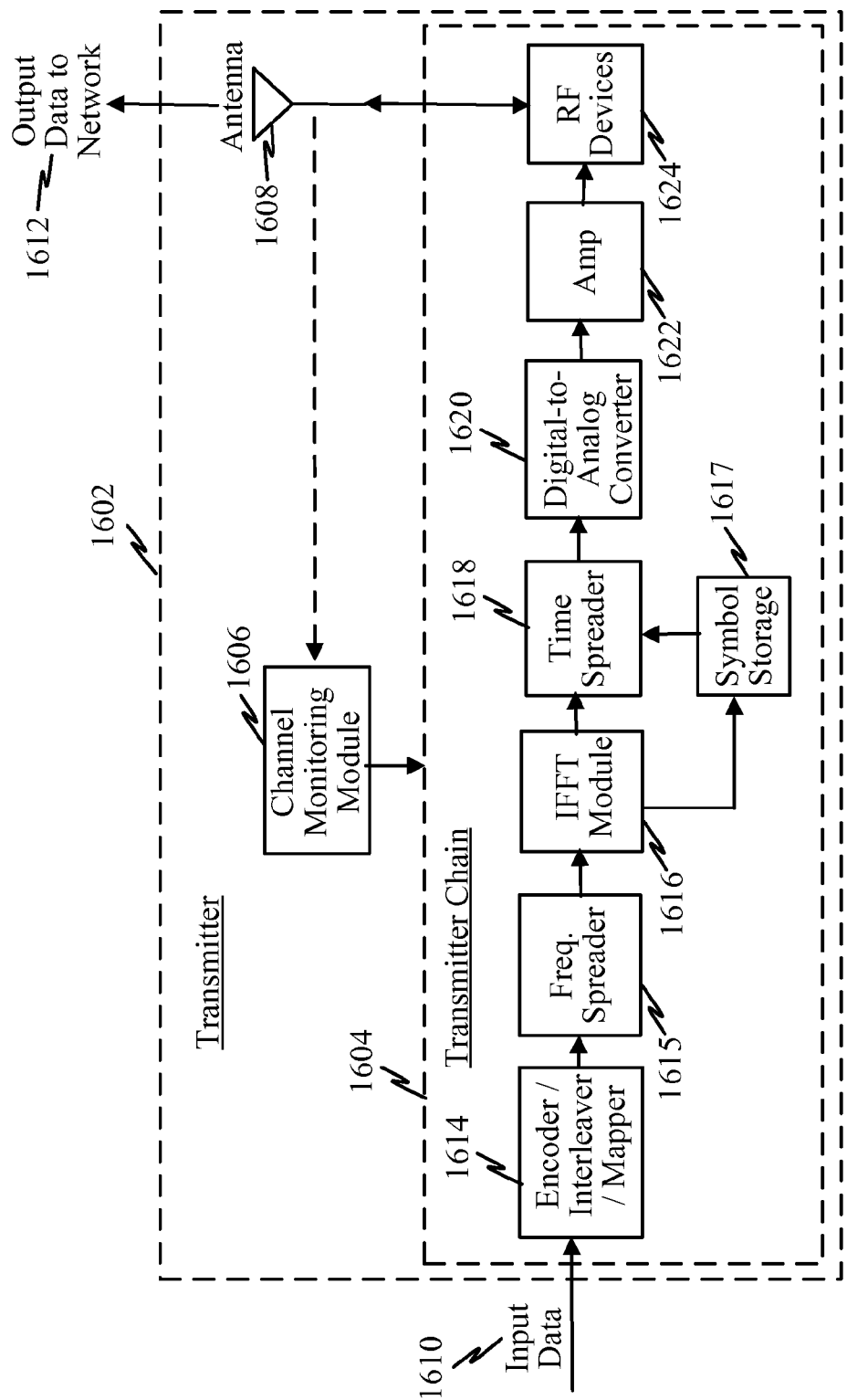
FIG. 16 is a block diagram illustrating a low-power transmitter that may be adapted to perform power-conservation.

FIG. 16 is a block diagram illustrating a low-power transmitter that may be adapted to perform power-conservation. In this block diagram, several transmitter components may have been omitted or combined for purposes of clarity. However, it should be understood that additional devices may be part of the transmitter 1602 without deviating from its novelty. The transmitter 1602 may include a transmitter chain 1604, a channel monitoring module 1606 and/or an antenna 1608. The channel monitoring module 1606 may be adapted to monitor a transmission channel (e.g., assigned frequency band or group) to determine one or more wireless channel characteristics such as desired signal strength, channel noise, noise floor, and/or interference. If the wireless channel characteristic (e.g., desired signal strength, channel noise, noise floor, interference, etc.) is below an acceptable threshold level, the transmitter 1602 may enter into a power conservation mode in which frequency and/or time diversity are sacrificed in exchange for utilizing less power during transmissions. That is, in a first (typical) mode of operation, the transmitter 1602 may employ frequency diversity (e.g., frequency spreading) and/or time diversity (e.g., time spreading)

from transmissions. However, if channel conditions are below an acceptable threshold level (e.g., noise or interference are relatively low), then the transmitter may enter into a second mode of operation (e.g., a power conservation mode), in which transmissions still occur but with lesser frequency and/or timing diversity.

The transmitter chain 1604 may include an encoder/interleaver/mapper 1604 that receives input data 1610, processes the input data (e.g., a symbol or plurality of symbols), and passes it to a frequency spreader 1615. In a first mode of operation, the frequency spreader 1615 may apply frequency diversity to a symbol in the input data by concurrently transmitting the same symbol on different frequencies, frequency bands, or tones. The symbol from the frequency spreader 1615 then passes to an IFFT Module 1616 where it is transformed in the frequency domain and a time spreader 1618 where the symbol is spread in the time domain to provide time diversity. A digital-to-analog converter (DAC) 1620 then converts the digital symbol into an analog signal. An amplifier 1622 may amplify the signal power for the output signal from the DAC 1620. One or more Radio Frequency (RF) Devices 1624 (e.g., filters, synthesizers, etc.) may process the output signal from the amplifier 1622 and transmits it via the antennal 1608.

If the channel monitoring module 1606 has determined that the wireless channel characteristics or conditions are below an acceptable threshold level, then the transmitter may enter into a second mode of operation. In this second mode of operation, frequency and/or timing diversity may be reduced and/or eliminated for the sake of power conservation. In one example, where the transmitter is a UWB transmitter, the nature of the UWB channel and lack of noise or interference may allow dispensing with time and/or frequency diversity without significantly affecting transmissions.

In one implementation, the transmitter 1602 may implement time gating (as previously described) during the second mode of operation. That is, rather than transmitting the same symbol a plurality of times with a transmit power of $P_0$ on different time periods (as in FIG. 9), time gating transmits the symbol just once at a higher transmit power. In one example, the transmission power may be directly proportional to the number of times the symbol would have otherwise been transmitted. For example, if a symbol would have normally been transmitted four times, then the new transmit power for the single symbol is $4 \times P_0$. Thus, even though time and frequency diversity are sacrificed, the single symbol that is transmitted is more likely to be correctly received since it has a higher transmit power. However, because the IFFT module 1616 (and possibly the frequency spreader 1615 and/or time spreader 1616) is shut off, the DAC 1620 may be cycled Off during the time in which the symbol is no longer repeated. To achieve this, the amplifier 1622 may be adapted so that it increases its transmit power when operating in this second mode of operation.

In another implementation, the transmitter 1602 may instead implement time repetition (as previously described) during the second mode of operation. That is, rather than transmitting the same symbol a plurality of times on different frequencies during different time periods (as illustrated in FIG. 9), the same symbol is generated just once, stored in a symbol storage 1617, and transmitted a plurality of times on the same frequency (as illustrated in FIG. 15). Note that once the symbol is stored in the symbol storage 1617, the frequency spreader 1615 and/or time spreader 1618 may be powered Off (not cycled Off) since they are not needed to generate the same symbol on different frequencies. Meanwhile, the IFFT module 1616 may be cycled Off/On (e.g., change in duty cycle) or it may be operated at a lower speed.

Note that the channel monitoring module 1606 may continuously, periodically, or regularly monitor the channel characteristics or conditions to determine if a change has occurred. If the channel characteristics are above a threshold level, then the transmitter 1602 may switch back to the first mode of operation. Also, in order to indicate to a receiver that the transmitter is transmitting data according to a second mode of operation, the transmitter may send a mode indicator to the receiver.

In some modes of operation, the transmitter 1602 may be adapted to implement both of time gating and time repetition schemes though not at the same time. That is, under certain channel conditions time gating may be selected, while in other channel conditions time repetition may be selected.

Consequently, a wireless transmitter device is provided a channel monitoring module and a transmitter chain. The channel monitoring module may be adapted to determine a wireless channel characteristic (e.g., desired signal strength, channel noise or interference) between the transmitter device and a receiver device. The transmitter chain may include an inverse Fast Fourier Transform module and at least one of a time spreader and frequency spreader. The transmitter chain may be adapted to: (1) select a first mode of symbol transmission in which at least one of time spreading and frequency spreading is enabled at a particular transmission rate if the wireless channel characteristic is above a threshold level; and/or (2) select a second mode of symbol transmission in which at least one of time spreading and frequency spreading is disabled relative to the first mode of symbol transmission and at the same particular transmission rate if the wireless channel characteristic is below the threshold level. That is, for a first data transmission rate (e.g., 106.7, 160, or 200 Mbps) the first mode of symbol transmission utilizes time spreading but the second mode of symbol transmission disables time spreading. Similarly, for a second data transmission rate (e.g., 53.33 or 80.0 Mbps) the first mode of symbol transmission utilizes both time spreading and frequency spreading but the second mode of symbol transmission disables at least one of time spreading and frequency spreading.

The transmitter chain may be further adapted to reduce one of either the duty cycle or speed of the inverse Fast Fourier Transform module if at least one of the time spreader and the frequency spreader are disabled, wherein a transmission rate from the wireless transmitter device remains the same despite the reduction of duty cycle or speed of the inverse Fast Fourier Transform module. The transmitter chain may be further adapted to convert a symbol from a digital representation to an analog signal for transmission over an ultra wideband wireless channel associated with the wireless channel characteristic. The transmitter chain may be further adapted to send an indicator to the receiver device that at least one of time spreader and frequency spreader are disabled.

According to some implementations, the time repetition and time gating may be performed when a transmitter chain is implementing Quadrature Phase Shift Keying (QPSK) modulation but not when it is implementing Dual Carrier Modulation (DCM).

Figure 17:
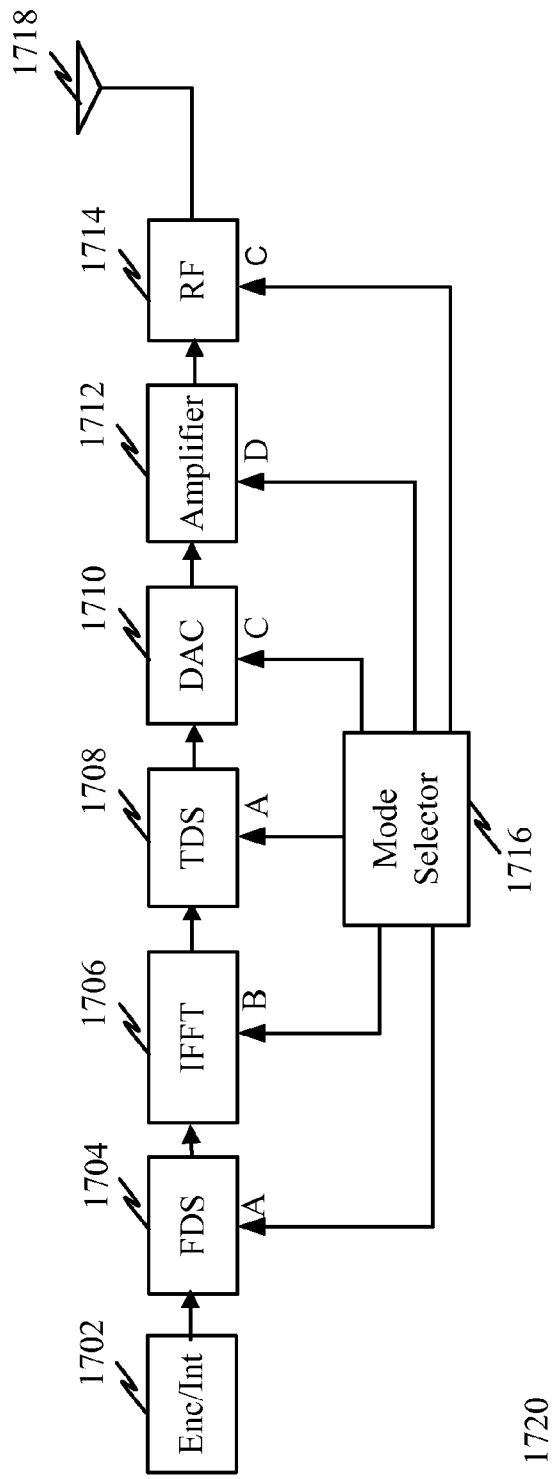
FIG. 17 is a block diagram illustrating how power conservation may be achieved using time gating on a transmitter device having multiple modes of operation.

FIG. 17 is a block diagram illustrating how power conservation may be achieved using time gating on a transmitter device having multiple modes of operation. The transmitter chain may include an encoder/interleaver 1702, a frequency domain spreader (FDS) 1704, an inverse Fast Fourier Transform module (IFFT) 1706, a time domain spreader (TDS) 1708, a digital-to-analog converter (DAC) 1710, an amplifier 1712, other radio frequency transmission devices 1714, and an antenna 1718. A mode selector 1716 may control the operation of one or more of the transmitter chain components by turning them On or Off, adjusting their duty cycle, and/or slowing their processing speed. Table 1720 illustrates an example of how the transmitter chain components may be operated in a first mode of transmission (regular operation) and in a second mode of transmission (power conservation operation). The mode selector 1716 may configure the various transmitter chain components as illustrated in table 1720. For instance, during power conservation, the FDS 1704 and/or TDS 1708 may be turned Off, the IFFT module 1706 may be cycled Off/On (e.g., reduce its duty cycle) or operated at a slower speed, and the DAC 1710 and/or the RF devices 1714 may be gated or cycled (e.g., reduce their duty cycles) to achieve power conservation. Meanwhile, the amplifier 1712 is adjusted to amplify the outgoing signal transmission; such as 3 dB power amplification for transmission rates of 106.7, 160 and 200 Mbps or 6 dB for transmission rates of 53.33 and 80 Mbps.

Figure 18:
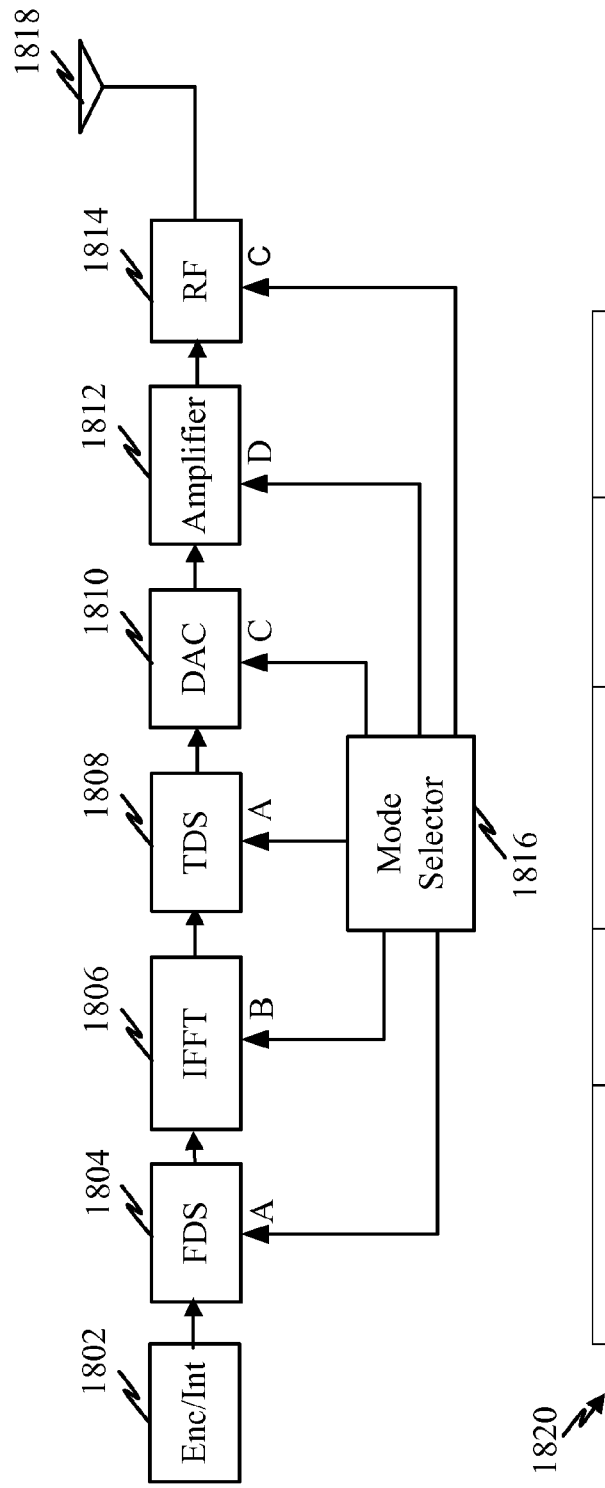
FIG. 18 is a block diagram illustrating how power conservation may be achieved using time repetition on a transmitter device having multiple modes of operation.

FIG. 18 is a block diagram illustrating how power conservation may be achieved using time repetition on a transmitter device having multiple modes of operation. For purposes of illustration, a similar transmitter chain as that of FIG. 17 is utilized in this example. The transmitter chain may include an encoder/interleaver 1802, a frequency domain spreader (FDS) 1804, an inverse Fast Fourier Transform module (IFFT) 1806, a time domain spreader (TDS) 1808, a digital-to-analog converter (DAC) 1810, an amplifier 1812, other radio frequency transmission devices 1814, and an antenna 1818. A mode selector 1816 may control the operation of one or more of the transmitter chain components by turning them On or Off, adjusting their duty cycle, and/or slowing their processing speed. Table 1820 illustrates an example of how the transmitter chain components may be operated in a first mode of transmission (regular operation) and in a second mode of transmission (power conservation operation). The mode selector 1816 may configure the various transmitter chain components as illustrated in table 1820. For instance, during power conservation, the FDS 1804 and/or TDS 1808 may be turned Off, the IFFT module 1806 may be cycled Off/On (e.g., reduce its duty cycle) or operated at a slower speed to achieve power conservation. Meanwhile, the DAC 1810 and/or the RF devices 1814 may be operated normally and the amplifier 1812 is powered Off (no amplification).

In some implementations, a mode selector may cause a transmitter chain to operate according to a regular mode of operation, a time gating power conservation mode (as illustrated in FIG. 17), and/or a time repetition power conservation mode (as illustrated FIG. 18).

Figure 19:
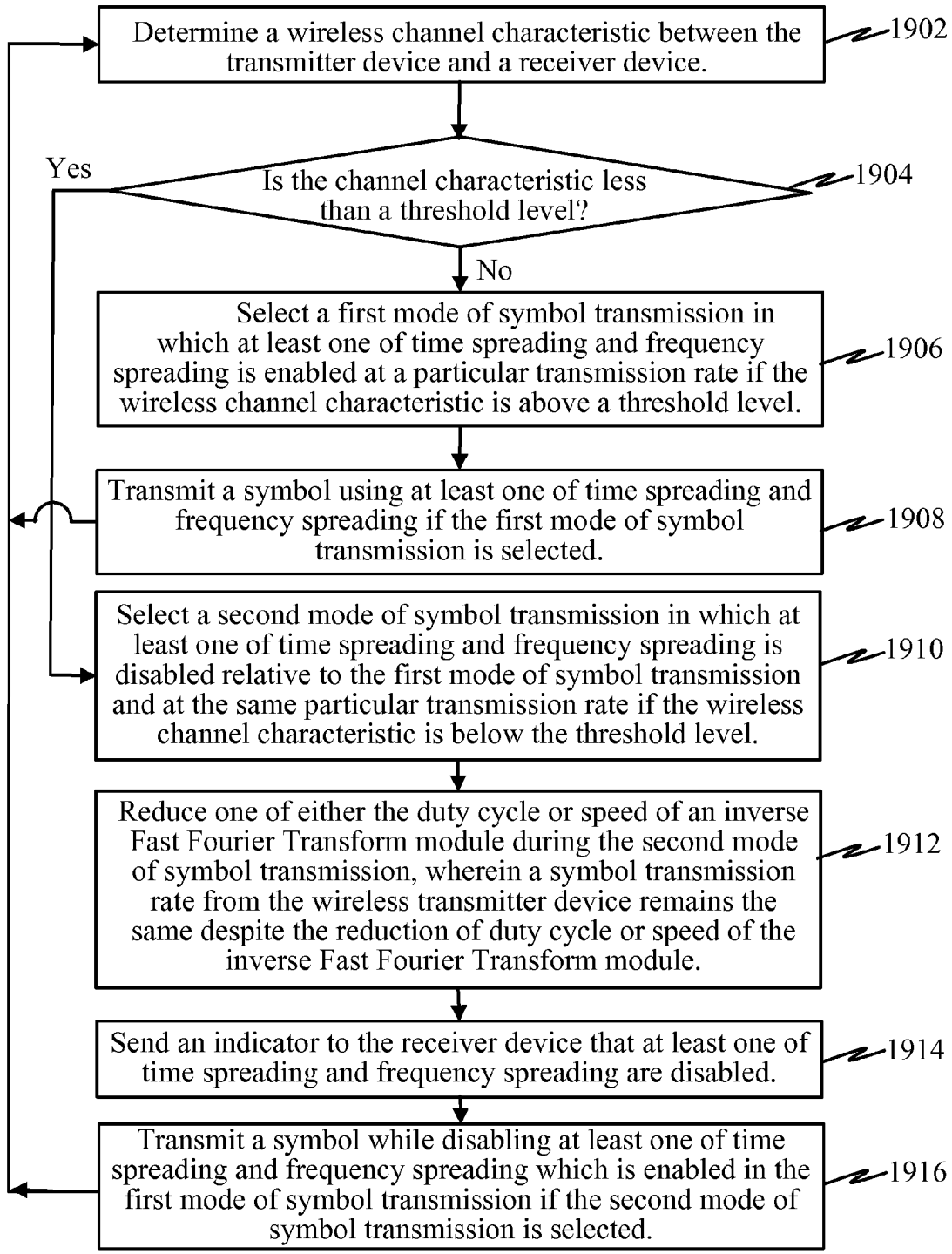
FIG. 19 illustrates a method for reducing power consumption in wireless transmitter device.

FIG. 19 illustrates a method for reducing power consumption in wireless transmitter device. A wireless channel characteristic between the transmitter device and a receiver device is determined or ascertained 1902. A determination may then be made as to whether the channel characteristic is less than a threshold level 1904. According to some examples, the wireless channel characteristic may include ascertaining at least one of: a desired signal strength, channel noise, a noise floor, or an interference level. The threshold level may be a value that is consider to acceptable such that time and/or frequency diversity. For example, the threshold level may be a desired signal strength threshold, channel noise threshold, a noise floor threshold, an interference level threshold, a combination or the inverse thereof.

If the wireless channel characteristic is above a threshold level, a first mode of transmission is selected in which at least one of time spreading and frequency spreading is enabled at a particular transmission rate 1906. A symbol may then be transmitted to the receiver device using at least one of time spreading and frequency spreading if the first mode of symbol transmission is selected 1908. Time spreading may include transmitting different versions of the same symbol at a plurality of different times. Frequency spreading may include concurrently transmitting the same symbol over different frequencies.

Otherwise, if the wireless channel characteristic is below the threshold level, a second mode of transmission may be selected in which at least one of time spreading and frequency spreading is disabled relative to the first mode of symbol transmission and at the same particular transmission rate 1910. For instance, for a first data transmission rate (e.g., 106.7, 160, or 200 Mbps) the first mode of symbol transmission may utilize time spreading but the second mode of symbol transmission may disable time spreading. Similarly, for a second data transmission rate (e.g., 53.33 or 80.0 Mbps) the first mode of symbol transmission may utilize both time spreading and frequency spreading but the second mode of symbol transmission may disable at least one of time spreading and frequency spreading.

One of either the duty cycle or speed of an inverse Fast Fourier Transform module (in the transmitter chain) may be reduced during the second mode of symbol transmission, wherein a transmission rate from the wireless transmitter device remains the same despite the reduction of duty cycle or speed of the inverse Fast Fourier Transform module 1912. An indicator may also be sent to the receiver device indicating that at least one of time spreading and frequency spreading are disabled 1914. A symbol may then be transmitted while disabling at least one of time spreading and frequency spreading which is enabled in the first mode of symbol transmission if the second mode of symbol transmission is selected 1916.

Note that, a symbol may be converted from a digital representation to an analog signal for transmission over an ultra wideband wireless channel associated with the wireless channel characteristic.

Figure 20:
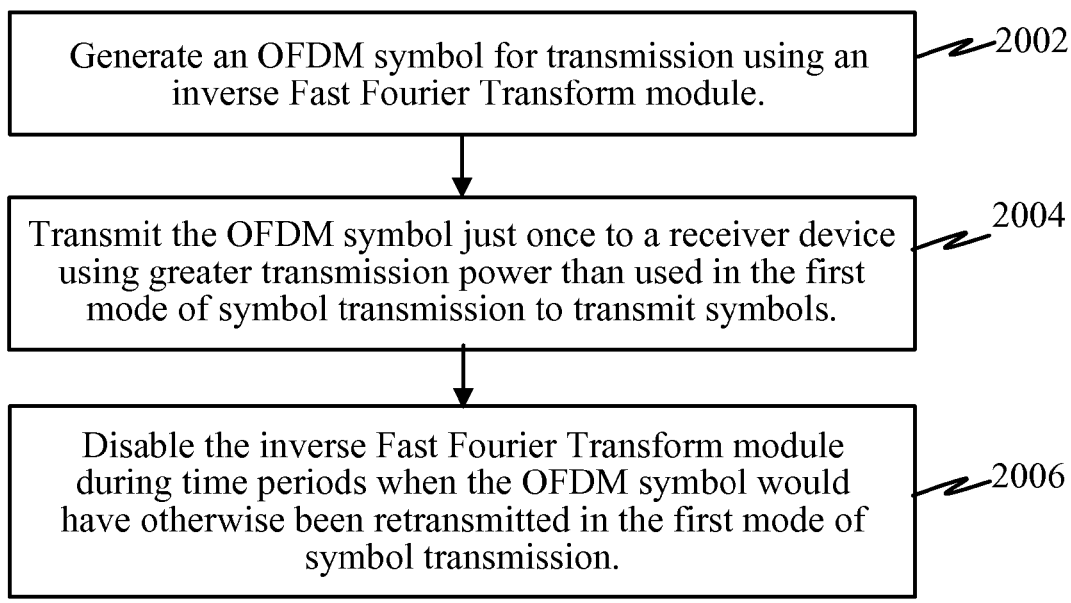
FIG. 20 illustrates an example of a method for performing time gating on a transmitter.

FIG. 20 illustrates an example of a method for performing time gating on a transmitter. This method for time gating may be implemented by: (a) generating an OFDM symbol for transmission using an inverse Fast Fourier Transform module 2002; (b) transmitting the OFDM symbol just once to a receiver device using greater transmission power than used in the first mode of symbol transmission to transmit symbols 2004; and/or (c) disabling the inverse Fast Fourier Transform module during time periods when the OFDM symbol would have otherwise been retransmitted in the first mode of symbol transmission 2006.

Figure 21:
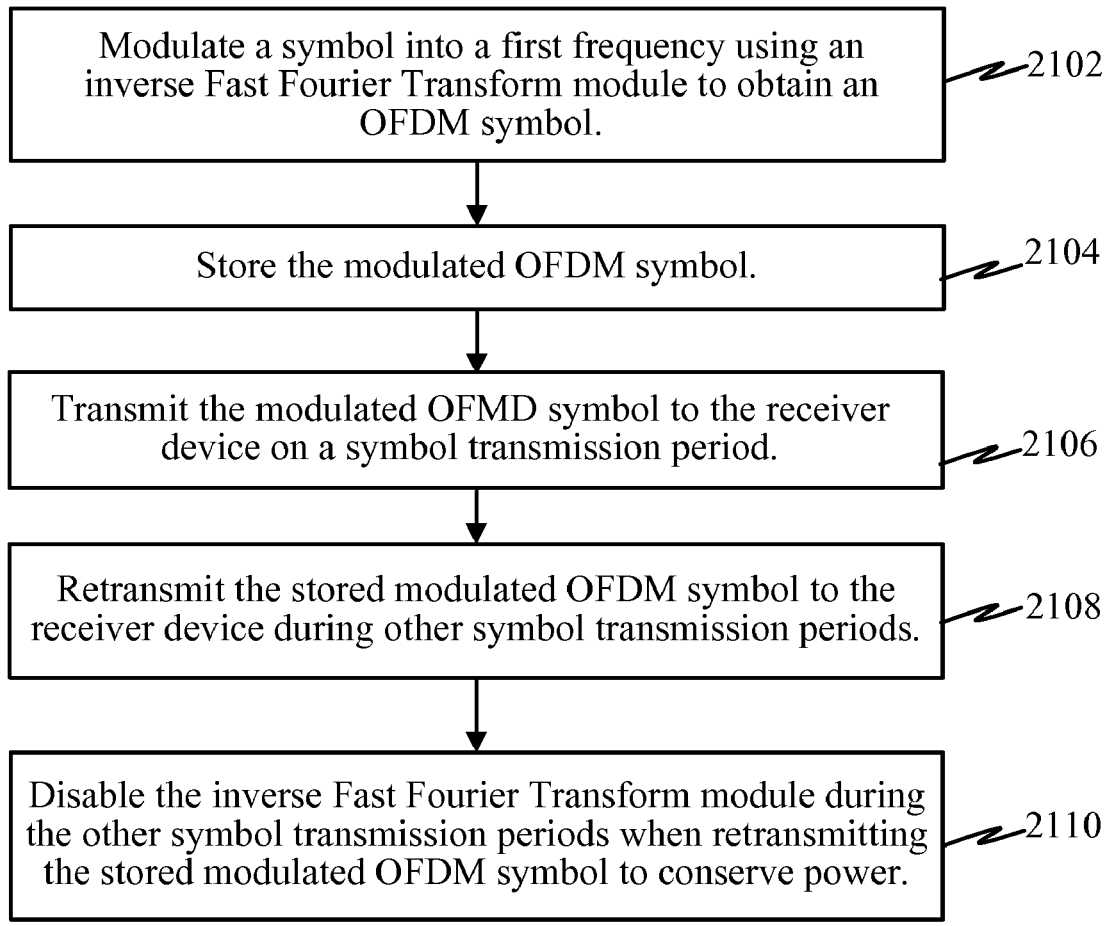
FIG. 21 illustrates an example of a method for performing time repetition on a transmitter.

FIG. 21 illustrates an example of a method for performing time repetition on a transmitter. This method for time repetition may be implemented by: (a) modulating a symbol into a first frequency using an inverse Fast Fourier Transform module to obtain an OFDM symbol 2102; (b) storing the modulated OFDM symbol 2104; (c) transmitting the modulated OFDM symbol to the receiver device on a symbol transmission period 2106; (d) retransmitting the stored modulated OFDM symbol to the receiver device during other symbol transmission periods 2108; and/or (e) disabling the inverse Fast Fourier Transform module during the other symbol transmission periods when retransmitting the stored modulated symbol to conserve power 2110.

Low-Power Receiver

Figure 22:
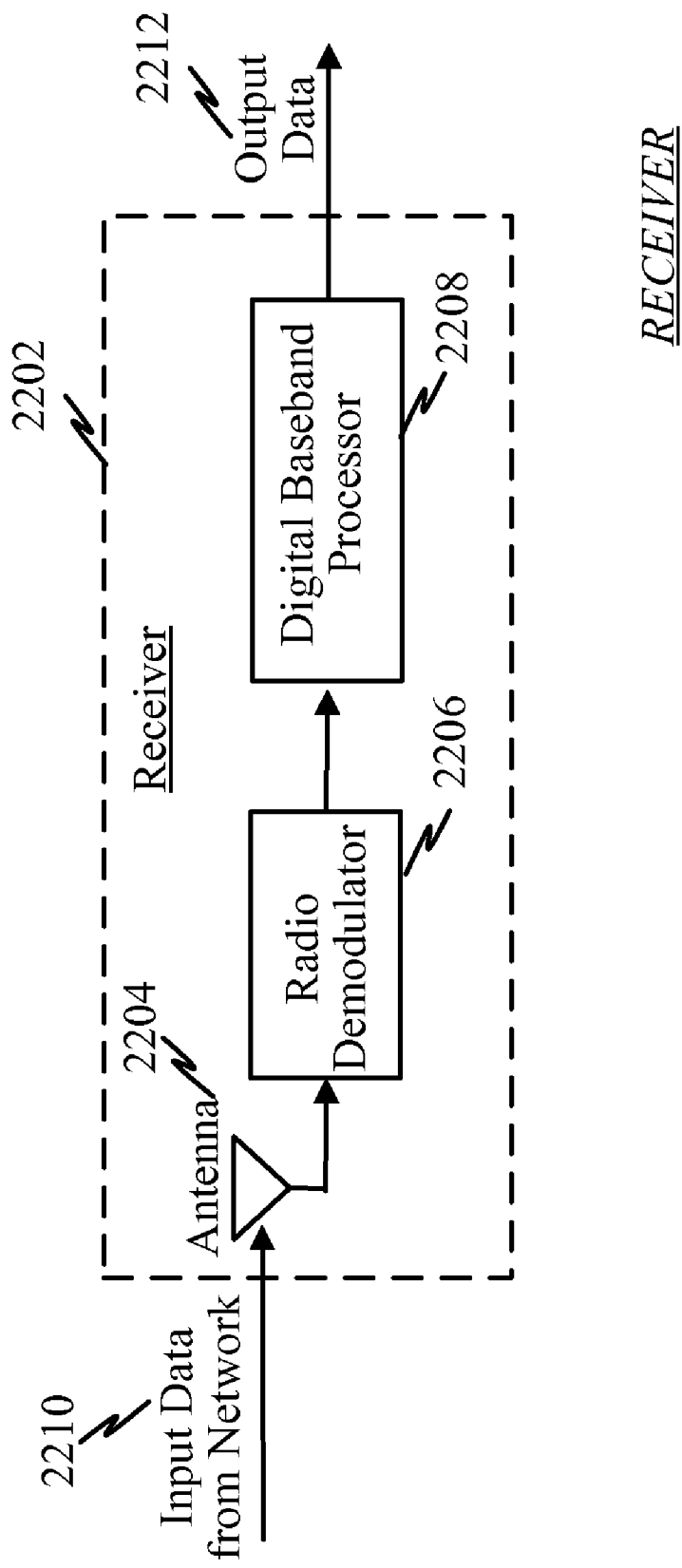
FIG. 22 is a block diagram illustrating an example of a wireless receiver that may be adapted for low-power consumption.

FIG. 22 is a block diagram illustrating an example of a wireless receiver that may be adapted for low-power consumption. The receiver 2202 may include a radio demodulator 2206 that receives input data 2210 from a network (e.g., a UWB network) over and antenna 2204. The received input data may be processed by a digital baseband processor 2208 to produce output data 2212.

Figure 23:
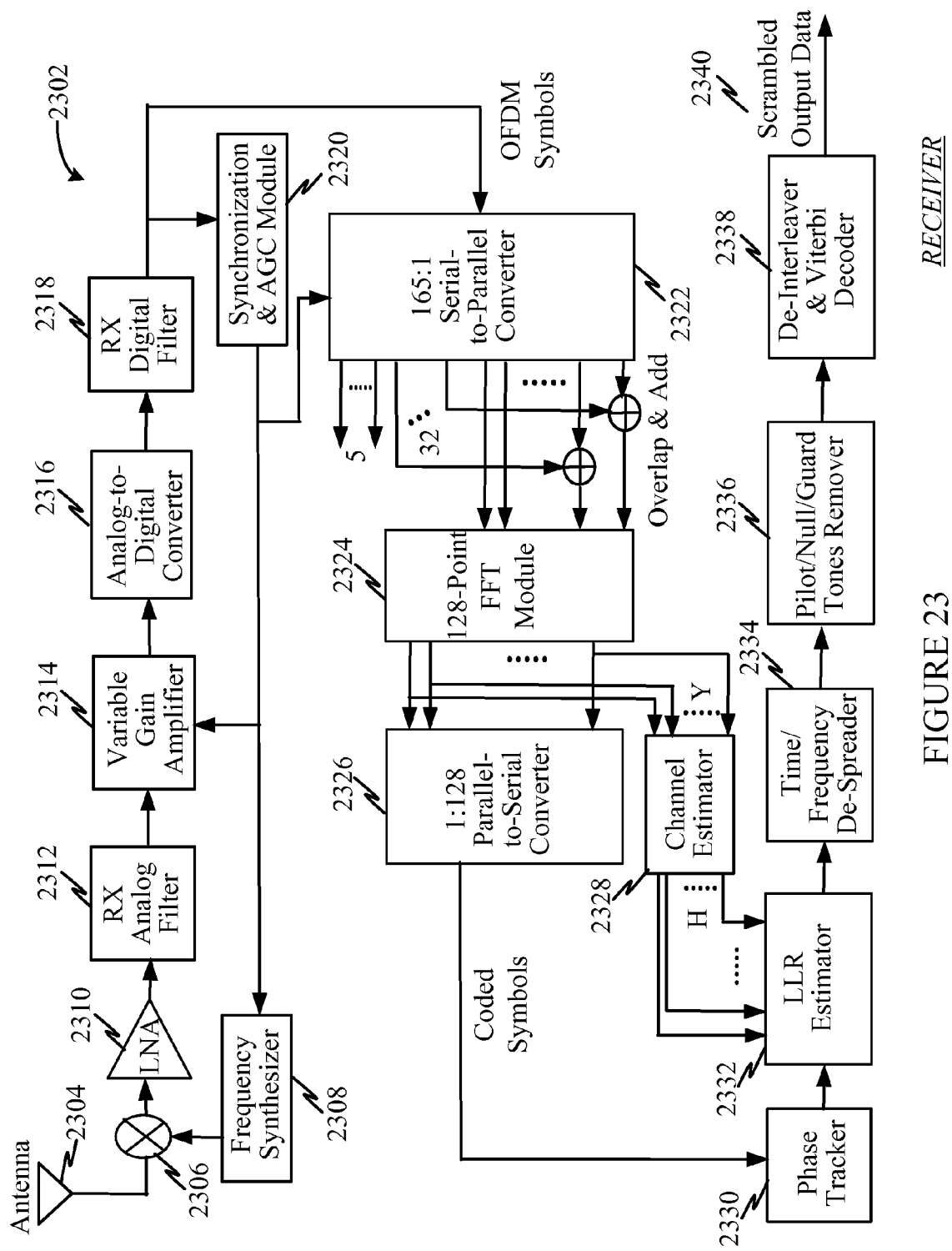
FIG. 23 is a block diagram illustrating a more detailed example of a receiver device.

FIG. 23 is a block diagram illustrating a more detailed example of a receiver device. In one example, one or more of the components illustrated in FIG. 23 may be part of the radio modulator 2206 and/or baseband processor 2208 of FIG. 22. The receiver 2302, may receive an over-the-air signal via the antenna 2304 and demodulates it by passing through a mixer 2306, a low-noise amplifier (LNA) 2310, a receive analog filter 2312, a variable gain amplifier (VGA) 2314, an analog-to-digital converter 2316, and a receive digital filter 2318 to obtain OFDM symbols. A synchronization and automatic gain control (AGC) module 2320 may synchronize a frequency synthesizer 2308, the VGA 2314 and a serial-to-parallel converter 2322. The OFDM symbols (from the demodulated signal) then pass through the serial-to-parallel converter 2322, a Fast Fourier Transform (FFT) module 2324, and a parallel-to-serial converter 2326 to obtain coded symbols. The serial data (coded symbols) then passes through a phase tracker 2330, a log-likelihood ratio (LLR) estimator 2332 that is coupled to a channel estimator 2328, a time and/or frequency de-spreader 2334, and a pilot/null/guard tones remover 2336, and a deinterleaver and viterbi decoder 2338 to produce output data 2340. Note that the receiver 2302 may include additional components that are not shown in order simplify the illustration.

According to various features, the receiver may be adapted to receive transmitted data from a transmitter. In one example, the transmitter may have a first mode of operation in which it modulates and transmits data according the ECMA 368 standard. In a second mode of operation, the transmitter may implement time gating and/or time repetition (as previously described) to conserve power during transmissions. Likewise, the receiver 2302 may take advantage of this second mode of operation to also conserve power.

Figure 24:
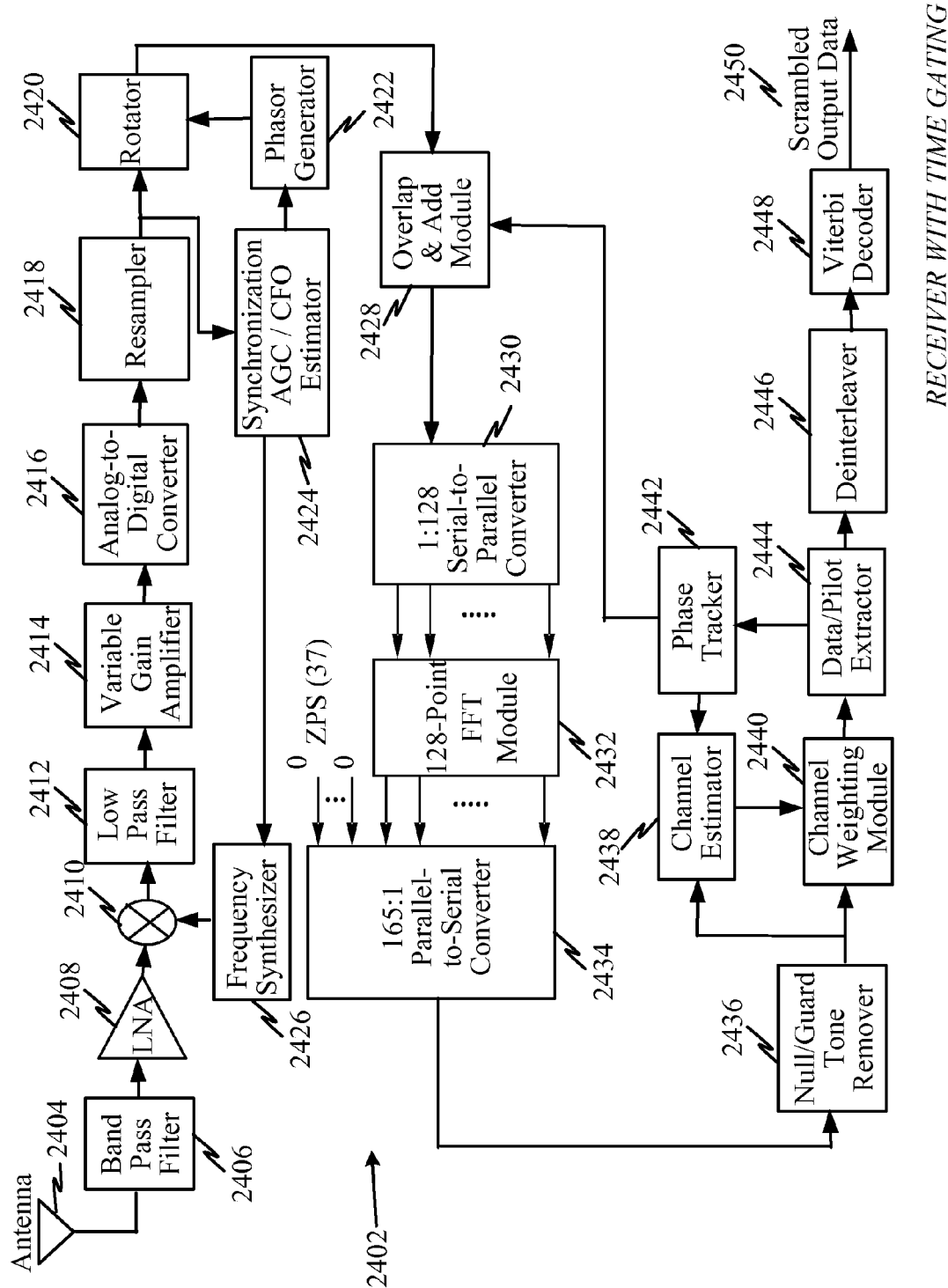
FIG. 24 is a block diagram illustrating how a receiver may operate when time gating is used by a transmitter.

FIG. 24 is a block diagram illustrating how a receiver may operate when time gating is used by a transmitter. In one example, one or more of the components illustrated in FIG. 24 may be part of the radio modulator 2206 and/or baseband processor 2208 of FIG. 22 or the receiver of FIG. 22. The receiver 2402, may receive an over-the-air signal via the antenna 2404 and passes through a band pass filter 2406 and a low-noise amplifier 2408. The signal is then passed through a mixer 2410, a receive analog filter (e.g., low pass filter) 2412, a variable gain amplifier (VGA) 2414, and an analog-to-digital converter 2416. The digitized symbol (in received signal) then passes through a resampler 2418 and rotator 2420. A synchronization and automatic gain control (AGC) module 2424 may synchronize a frequency synthesizer 2426 and a phasor generator 2422 coupled to the rotator 2420. The serial digital data then passes through an overlap and add module 2428, a serial-to-parallel converter 2430, a Fast Fourier Transform (FFT) module 2432, and a parallel-to-serial converter 2434. The serial data then passes through a null/guard tone remover 2436 and channel weighting module 2440 that is adjusted according to a channel estimator 2438 and phase tracker 2442. A data/pilot extractor 2444 then extracts data or pilots from the signal which then passes through a deinterleaver 2446 and viterbi decoder 2448 to produce output data 2450. Note that the receiver 2402 may include additional components that are not shown in order simplify the illustration.

The receiver 2402 may be adapted to receive a symbol over a single transmission at a higher power than typical (as illustrated in FIGS. 13 and 14) rather than receiving the same multiple versions of the same symbol on different frequencies (as illustrated in FIG. 8). Because a symbol is being received just once, various components of the receiver 2402 may be cycled Off or slowed down to conserve power. For instance, the FFT module 2432, the VGA 2414, ADC 2416, etc., may be operated at a lower speed or cycled Off.

According to one feature, the FFT module 2432 may be slowed down when time gating is implemented. For example, for data rates 53.33 and 80 Mbps (in the ECMA 368 standard for UWB), the FFT module 2432 may be operated at one fourth its original speed (since just one symbol is being sent instead of four). For data rates of 106.7, 160, and 200 Mbps, the FFT module 2432 may be operated at one half its original speed (since just one symbol is being sent instead of two).

According to another feature, the FFT module 2432 may instead by cycled Off and On to conserve power during time gating. For example, for data rates 53.33 and 80 Mbps (in the ECMA 368 standard for UWB), the FFT module 2432 may be operated just one fourth of the time and cycled Off three quarters of the time (since just one symbol is being sent instead of four). For data rates of 106.7, 160, and 200 Mbps, the FFT module 2432 may be operated at one half of the time and cycled Off the other half the time (since just one symbol is being sent instead of two).

According to one example of time gating at the receiver, the antenna 2404, band pass filter 2406, LNA 2408, mixer 2410, low pass filter 2412, VGA 2414, ADC 2416, and synthesizer 2426 may be cycled Off/On (reduced duty cycle). The resampler 2418, rotator 2420, phasor generator 2422, synchronization estimator 2424, overlap and add module 2428, serial-to-parallel converter 2430, FFT module 2432, parallel-to-serial converter 2434, null/guard tone remover 2436, channel estimator 2438, channel weighting module 2440, phase tracker 2442, and/or data/pilot extractor 2444 may be cycled Off/On or operated at a lower speed to conserve power.

Figure 25:
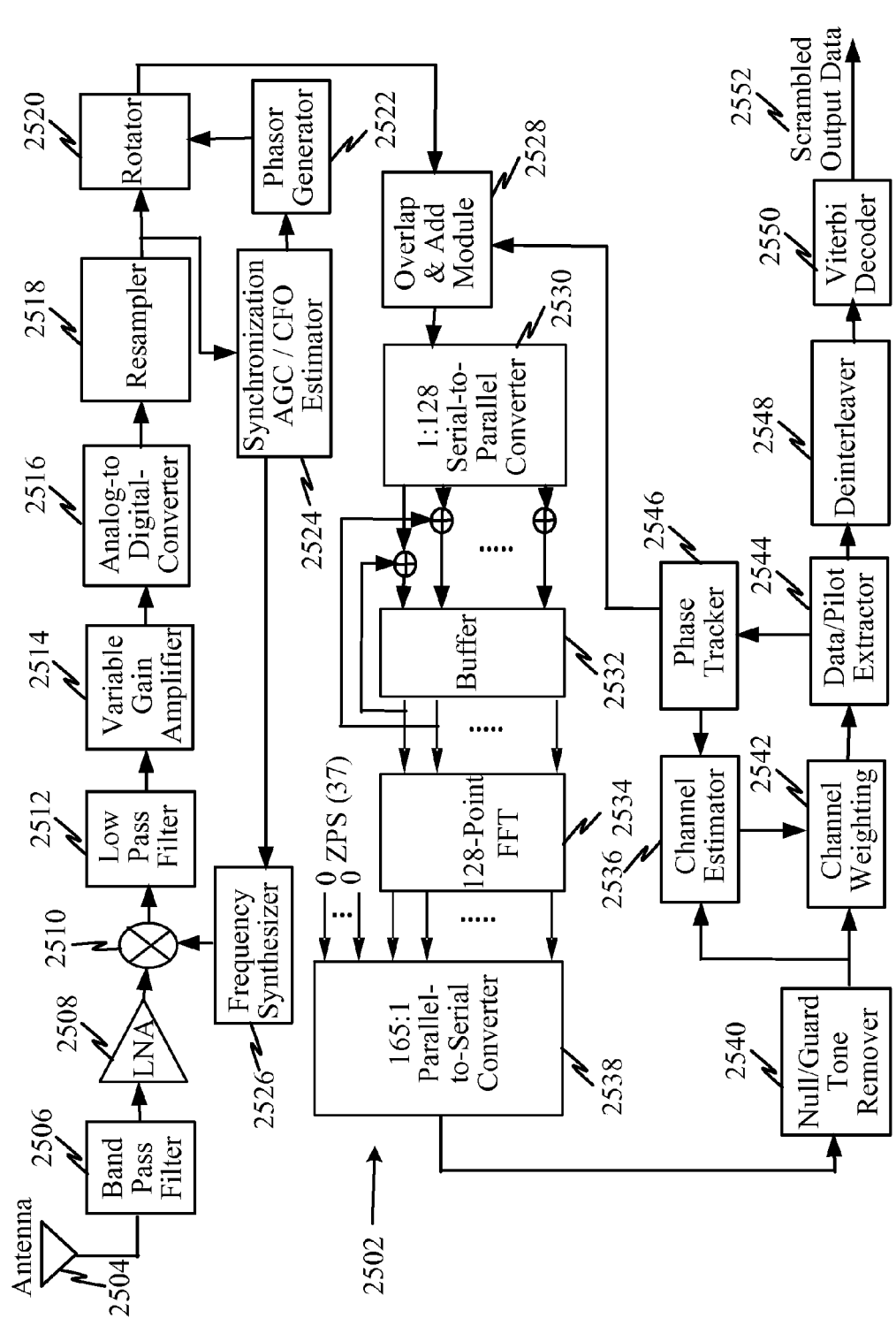
FIG. 25 is a block diagram illustrating how a receiver may operate when time repetition is used by a transmitter.

FIG. 25 is a block diagram illustrating how a receiver may operate when time repetition is used by a transmitter. In one example, one or more of the components illustrated in FIG. 25 may be part of the radio modulator 2206 and/or baseband processor 2208 of FIG. 22 or the receiver of FIG. 23. The receiver 2502, may receive an over-the-air signal via the antenna 2504 and passes through a band pass filter 2506 and a low-noise amplifier 2508. The signal is then passed through a mixer 2510, a receive analog filter (e.g., low pass filter) 2512, a variable gain amplifier (VGA) 2514, and an analog-to-digital converter 2516. The digitized symbol (in received signal) then passes through a resampler 2518 and rotator 2520. A synchronization and automatic gain control (AGC) module 2524 may synchronize a frequency synthesizer 2526 and a phasor generator 2522 coupled to the rotator 2520. The serial digital data then passes through an overlap and add module 2528, and a serial-to-parallel converter 2530.

When time repetition is implemented, the receiver 2502 receives each copy of the same symbol and processes them individually by the receiver chain. However, the output of the analog components (e.g., the output from the serial-to-parallel converter 2530) is stored (in a buffer 2532) for the first copy symbol and the other copies of the symbol are added to this stored copy. An FFT module 2534 waits to process the current symbol until all copies of the symbol are accumulated in the buffer 2532. Therefore, for data rates of 53.33 and 80 Mbps (of the ECMA 368 Standard) the FFT module 2534 can be run one fourth of the time (since a symbol is sent four times). Similarly, for data rates data rates 106.7, 160 and 200 Mbps the FFT module 2534 can be run one half of the time (since a symbol is sent twice). Another solution is to operate the FFT module 2534 to run at one fourth of its normal speed for data rates 53.33 and 80 Mbps and one half its typical speed for data rates 106.7, 160 and 200 Mbps.

Once processed by the FFT module 2534, the symbol may be further processed by a parallel-to-serial converter 2538 to produce serial data (obtain coded symbols). The serial data then passes through a null/guard tone remover 2540 and channel weighting module 2542 that is adjusted according to a channel estimator 2536 and phase tracker 2546. A data/pilot extractor 2544 then extracts data or pilots from the signal which then passes through a de-interleaver 2548 and Viterbi decoder 2550 to produce output data 2552. Note that the receiver 2502 may include additional components that are not shown in order simplify the illustration.

The receiver 2502 may be adapted to perform time repetition (as illustrated in FIG. 15). The receiver may receive a symbol on a first transmission frequency a plurality of times on different symbol transmission periods, thereby allowing for the accumulation of the various retransmissions of the same symbol. Such retransmission of the same symbol on the same frequency is illustrated in FIG. 15. Because the symbol is being accumulated, the FFT module 2534 (and possibly other components) in the receiver chain may be cycled Off for longer periods of time or can run at lower speeds to conserve energy.

According to one example of time repetition, the FFT module 2534, channel estimator 2536, parallel-to-serial converter 2538, null/guard tone remover 2540, channel weighting module 2542, phase tracker 2544, and/or data/pilot extractor 2546 may be cycled Off/On or operated at a lower speed to conserve power.

Figure 26:
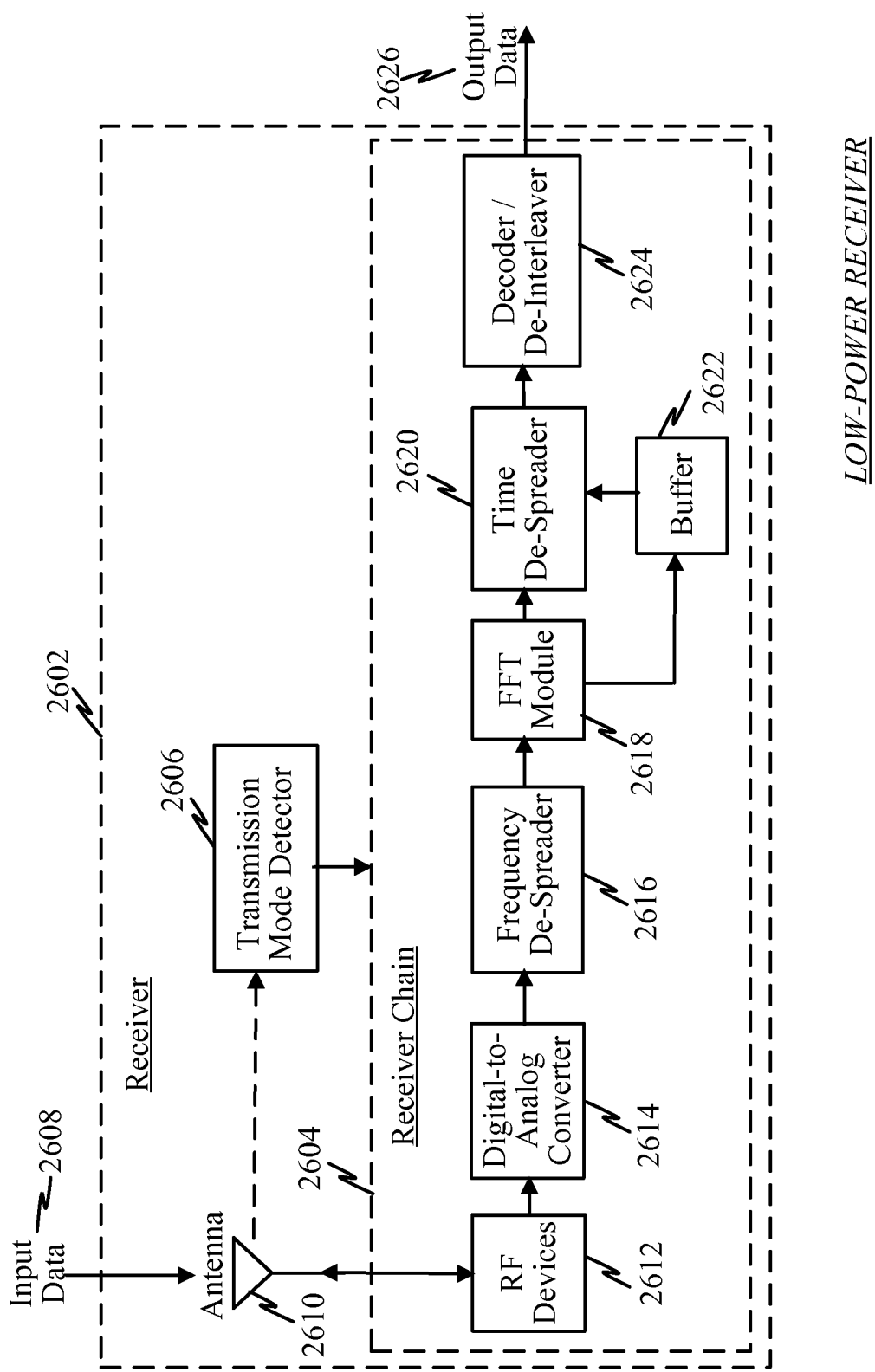
FIG. 26 is a block diagram illustrating a low-power receiver that may be adapted to perform power-conservation.

FIG. 26 is a block diagram illustrating a low-power receiver that may be adapted to perform power-conservation. The receiver 2602 may include an antenna 208, a transmission mode detector 2606, and a receiver chain 2604. The transmission mode detector may be adapted to receive an indicator from a transmitter device indicating at least one of two modes of symbol transmission. The receiver chain 2604 may receive input data 2608 via the antenna 2608 and processes the input data via a RF devices 2612, a DAC 2614, a frequency de-spreader 2616, an FFT module 2618, a time de-spreader 2620, a buffer 2622, and a decoder/de-interleaver 2624 to produce output data 2626. The receiver chain may be adapted to: (a) receive a symbol according to a first mode where the transmitter device enables at least one of time spreading and frequency spreading for a particular transmission rate, (b) receive the symbol according to a second mode where the transmitter device disables at least one of time spreading and frequency spreading relative to the first mode of symbol transmission and the same particular data transmission rate; and/or (c) reduce one of either the duty cycle or processing speed of the Fast Fourier Transform module in the second mode relative to the first mode for the same particular transmission rate. For a first data transmission rate, the first mode of symbol transmission may utilize time spreading but the second mode of symbol transmission disables time spreading. For a second data transmission rate, the first mode of symbol transmission utilizes both time spreading and frequency spreading but the second mode of symbol transmission disables at least one of time spreading and frequency spreading.

Figure 27:
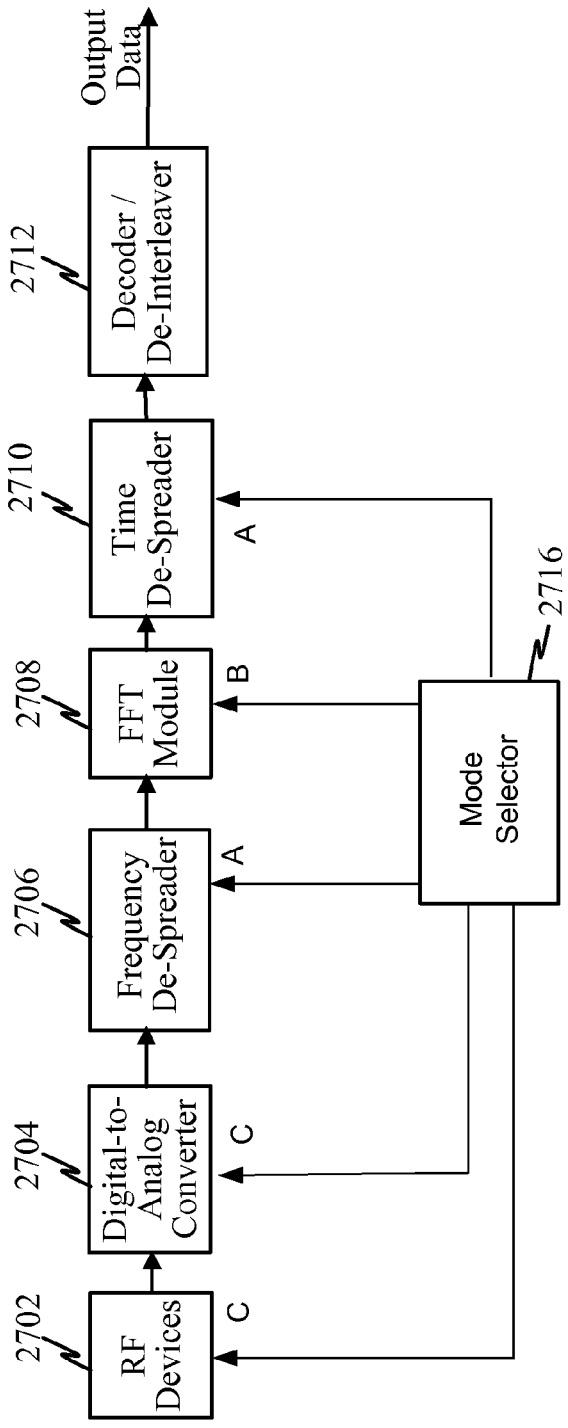
FIG. 27 is a block diagram illustrating how power conservation may be achieved using time repetition on a receiver device having multiple modes of operation.

FIG. 27 is a block diagram illustrating how power conservation may be achieved using time repetition on a receiver device having multiple modes of operation. The receiver chain may include radio frequency (RF) devices 2702, a digital-to-analog converter 2704, a frequency de-spreader 2706, a Fast Fourier Transform (FFT) module 2708, a time de-spreader 2710, and/or a decoder/de-interleaver 2712. A mode selector 2716 may control the operation of one or more of the receiver chain components by turning them On or Off, adjusting their duty cycle, and/or slowing their processing speed. Table 2720 illustrates an example of how the receiver chain components may be operated in a first mode of transmission (regular operation), in a second mode of transmission (power conservation by time gating), and in a third mode of transmission (power conservation by time repetition). The mode selector 2716 may configure the various receiver chain components as illustrated in table 2720. For instance, during power conservation by time gating, the RF Devices 2702 and DAC 2704 may be gated/cycled (e.g., change in duty cycle), the FDS 2706 and/or TDS 2710 may be turned Off, and the FFT module 2708 may be cycled Off/On (e.g., reduce its duty cycle) or operated at a slower speed to achieve power conservation. In another instance, during power conservation by time repetition, the RF Devices 2702 and DAC 2704 may be operated normally (without gating/cycling), the FDS 2706 and/or TDS 2710 may be turned Off, and the FFT module 2708 may be cycled Off/On (e.g., reduce its duty cycle) or operated at a slower speed to achieve power conservation.

In various implementations, the mode selector 2716 may cause the receiver chain to operate according to a regular mode of operation, a time gating power conservation mode, and/or a time repetition power conservation mode. Note that some implementations of the receiver may include either time gating or time repetition but not both, while other implementations may include both time gating and time repetition, though not at the same time.

Figure 28:
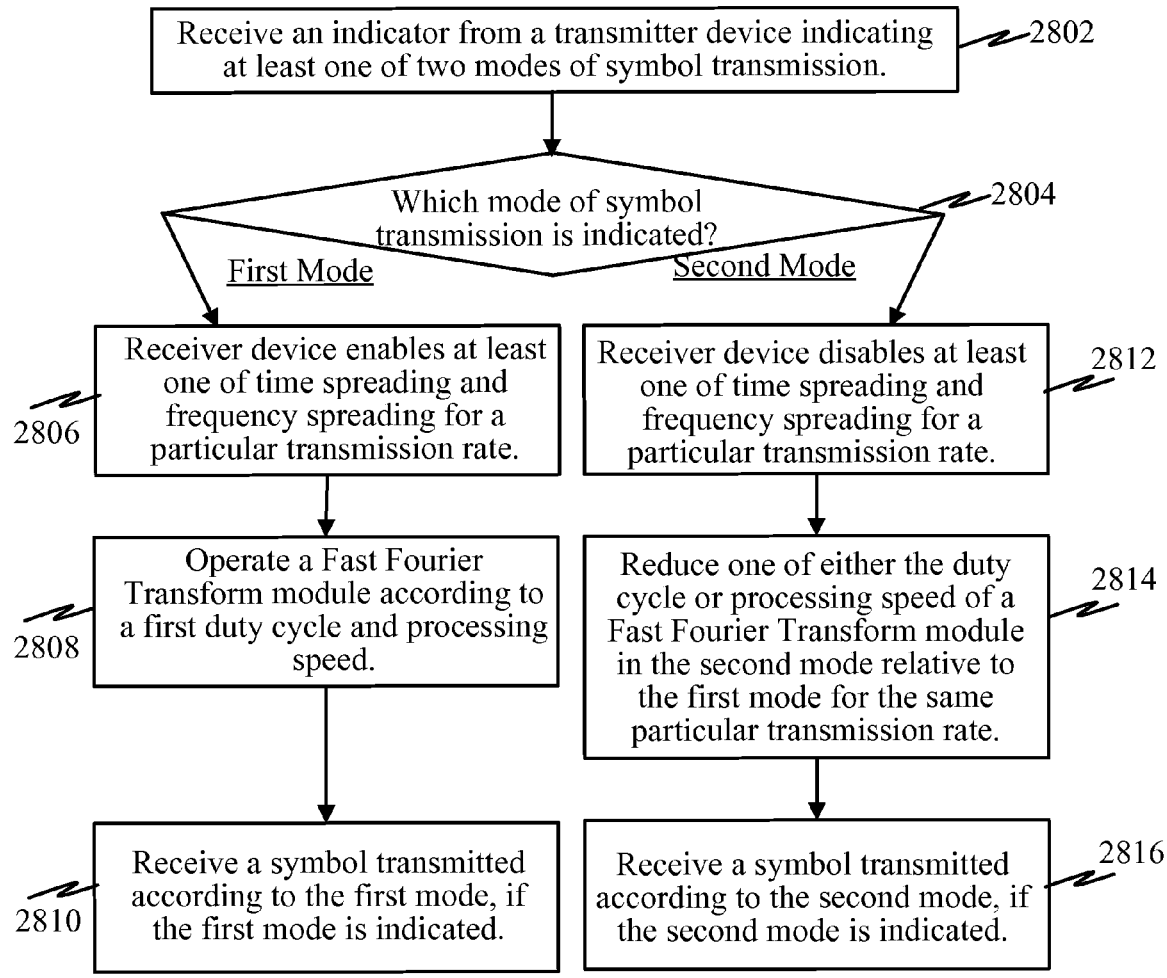
FIG. 28 illustrates a method for reducing power consumption in wireless receiver device.

FIG. 28 illustrates a method for reducing power consumption in wireless receiver device. An indicator may be received from a transmitter device indicating at least one of two modes of symbol transmission 2802. A determination is made as to which mode of symbol transmission is indicated 2804.

In a first mode of symbol transmission, the receiver device enables at least one of time spreading and frequency spreading for a particular transmission rate 2806. A Fast Fourier Transform module is operated according a first duty cycle and processing speed 2808. Subsequently, a symbol may be received that is transmitted according to the first mode 2810. Time spreading may include the transmission of the same symbol at a plurality of different times over different frequencies. Frequency spreading may include the concurrent transmission of the same symbol over different frequencies.

In a second mode of symbol transmission, the receiver device disables at least one of time spreading and frequency spreading relative to the first mode of symbol transmission and the same particular transmission rate 2812. In the second mode, one of either the duty cycle or processing speed of the Fast Fourier Transform module is reduced relative to the first mode for the same particular transmission rate 2814. Subsequently, a symbol may be received that is transmitted according to the second mode 2816. For a first data transmission rate, the first mode of symbol transmission may utilize time spreading but the second mode of symbol transmission disables time spreading. For a second data transmission rate, the first mode of symbol transmission may utilize both time spreading and frequency spreading but the second mode of symbol transmission disables at least one of time spreading and frequency spreading. The receiver device may be compliant with the ultra wideband European Computer Manufacturers Association (ECMA) 368 standard.

In one implementation, when operating according to the second mode, the receiver may be adapted to receive symbols according to a time repetition scheme. The same version of a symbol may be received over the same frequency over a plurality of symbol transmission periods. The received versions of the symbol are then accumulated. The Fast Fourier Transform module may be disabled until all versions of the symbol have been received to conserve power. The accumulated symbol may then be processed using the Fast Fourier Transform module.

In one implementation, when operating according to the second mode, the receiver may be adapted to receive symbols according to a time gating scheme. A symbol may be received just once instead of a plurality of times over a plurality of symbol transmission periods as in the first mode, wherein the symbol is transmitted at a higher power than used in the first mode for the same symbol transmission. The Fast Fourier Transform module may be disabled during time periods when the symbol would have otherwise been retransmitted in the first mode of symbol transmission.

Note that, whether time gating or time repetition is used during a power conservation mode, the effective data transmission rate may remain the same during the power conservation mode relative to a normal mode of operation.

It should be recognized that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One or more of the components, steps, and/or functions illustrated in the FIGs. may be rearranged and/or combined into a single component, step, or function or embodied in several components, steps, or functions without affecting the operation of the pseudo-random number generation. Additional elements, components, steps, and/or functions may also be added without departing from the invention. The apparatus, devices, and/or components illustrated in the Figures may be configured to perform one or more of the methods, features, or steps described in the Figures. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. For example, some implementations of the invention may be performed with a moving or static communication device (e.g., access terminal) and a plurality of mobile or static base stations (e.g., access points).

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for reducing power consumption in wireless transmitter device, comprising:
   determining a wireless channel characteristic between the transmitter device and a receiver device;
   selecting a first mode of symbol transmission in which at least one of time spreading and frequency spreading is enabled at a particular transmission rate if the wireless channel characteristic is above a threshold level; and
   selecting a second mode of symbol transmission in which at least one of time spreading and frequency spreading is disabled relative to the first mode of symbol transmission and at the same particular transmission rate if the wireless channel characteristic is below the threshold level.

2. The method of claim 1, wherein determining the wireless channel characteristic includes ascertaining desired signal strength and at least one of: a channel noise, a noise floor, or an interference level.

3. The method of claim 1, wherein for a first data transmission rate the first mode of symbol transmission utilizes time spreading but the second mode of symbol transmission disables time spreading.

4. The method of claim 3, wherein for a second data transmission rate the first mode of symbol transmission utilizes both time spreading and frequency spreading but the second mode of symbol transmission disables at least one of time spreading and frequency spreading.

5. The method of claim 1, wherein time spreading includes transmitting different versions of the same symbol at a plurality of different times.

6. The method of claim 1, wherein frequency spreading includes concurrently transmitting the same symbol over different frequencies.

7. The method of claim 1, further comprising:
transmitting a symbol using at least one of time spreading and frequency spreading if the first mode of symbol transmission is selected; and
transmitting a symbol while disabling at least one of time spreading and frequency spreading which is enabled in the first mode of symbol transmission if the second mode of symbol transmission is selected.

8. The method of claim 1, wherein the transmitter is compliant with the ultra wideband European Computer Manufacturers Association (ECMA) 368 standard.

9. The method of claim 1, further comprising:
reducing one of either the duty cycle or speed of an inverse Fast Fourier Transform module during the second mode of symbol transmission, wherein a transmission rate from the wireless transmitter device remains the same despite the reduction of duty cycle or speed of the inverse Fast Fourier Transform module.

10. The method of claim 1, wherein during the second mode of symbol transmission the method further comprising:
modulating a symbol into a first frequency using an inverse Fast Fourier Transform module;
storing the modulated symbol;
transmitting the modulated symbol to the receiver device on a symbol transmission period;
retransmitting the stored modulated symbol to the receiver device during other symbol transmission periods; and
disabling the inverse Fast Fourier Transform module during the other symbol transmission periods when retransmitting the stored modulated symbol to conserve power.

11. The method of claim 1, wherein during the second mode of symbol transmission the method further comprising:
generating a symbol for transmission using an inverse Fast Fourier Transform module;
transmitting the symbol just once to a receiver device using greater transmission power than used in the first mode of symbol transmission to transmit symbols; and
disabling the inverse Fast Fourier Transform module during time periods when the symbol would have otherwise been retransmitted in the first mode of symbol transmission.

12. The method of claim 1, further comprising:
converting a symbol from a digital representation to an analog signal for transmission over an ultra wideband wireless channel associated with the wireless channel characteristic.

13. The method of claim 1, further comprising:
sending an indicator to the receiver device that at least one of time spreading and frequency spreading are disabled.

14. A wireless transmitter device, comprising:
a channel monitoring module for determining a wireless channel characteristic between the transmitter device and a receiver device; and
a transmitter chain including an inverse Fast Fourier Transform module and at least one of a time spreader and frequency spreader, wherein the transmitter chain is adapted to:
select a first mode of symbol transmission in which at least one of time spreading and frequency spreading is enabled at a particular transmission rate if the wireless channel characteristic is above a threshold level; and
select a second mode of symbol transmission in which at least one of time spreading and frequency spreading is disabled relative to the first mode of symbol transmission and at the same particular transmission rate if the wireless channel characteristic is below the threshold level.

15. The wireless transmitter device of claim 14, wherein the transmitter chain is further adapted to:
reduce one of either the duty cycle or speed of the inverse Fast Fourier Transform module during the second mode of symbol transmission, wherein a transmission rate from the wireless transmitter device remains the same despite the reduction of duty cycle or speed of the inverse Fast Fourier Transform module.

16. The wireless transmitter device of claim 14, wherein the transmitter chain is further adapted to:
convert a symbol from a digital representation to an analog signal for transmission over an ultra wideband wireless channel associated with the wireless channel characteristic.

17. The wireless transmitter device of claim 14, wherein the transmitter chain is further adapted to:
send an indicator to the receiver device that at least one of time spreader and frequency spreader are disabled.

18. The wireless transmitter device of claim 14, wherein during the second mode of symbol transmission the transmitter chain is adapted to:
modulate a symbol into a first frequency using an inverse Fast Fourier Transform module;
store the modulated symbol;
transmit the modulated symbol to the receiver device on a symbol transmission period;
retransmit the stored modulated symbol to the receiver device during other symbol transmission periods; and
disable the inverse Fast Fourier Transform module during the other symbol transmission periods when retransmitting the stored modulated symbol to conserve power.

19. The wireless transmitter device of claim 14, wherein during the second mode of symbol transmission the transmitter chain is adapted to:
generate a symbol for transmission using an inverse Fast Fourier Transform module;
transmit the symbol just once to a receiver device using greater transmission power than used in the first mode of symbol transmission to transmit symbols; and disable the inverse Fast Fourier Transform module during time periods when the symbol would have otherwise been retransmitted in the first mode of symbol transmission.

20. A wireless transmitter device, comprising:
means for determining a wireless channel characteristic between the transmitter device and a receiver device;
means for selecting a first mode of symbol transmission in which at least one of time spreading and frequency spreading is enabled at a particular transmission rate if the wireless channel characteristic is above a threshold level; and
means for selecting a second mode of symbol transmission in which at least one of time spreading and frequency spreading is disabled relative to the first mode of symbol transmission and at the same particular transmission rate if the wireless channel characteristic is below the threshold level.

21. The wireless transmitter device of claim 20, further comprising:
means for reducing one of either the duty cycle or speed of an inverse Fast Fourier Transform module if at least one of time spreading and frequency spreading are disabled, wherein a transmission rate from the wireless transmitter device remains the same despite the reduction of duty cycle or speed of the inverse Fast Fourier Transform module.

22. A computer-readable medium comprising instructions for reducing power consumption of a wireless transmitter device, which when executed by a processor causes the processor to:
determine a wireless channel characteristic between the transmitter device and a receiver device;
select a first mode of symbol transmission in which at least one of time spreading and frequency spreading is enabled at a particular transmission rate if the wireless channel characteristic is above a threshold level; and
select a second mode of symbol transmission in which at least one of time spreading and frequency spreading is disabled relative to the first mode of symbol transmission and at the same particular transmission rate if the wireless channel characteristic is below the threshold level.

23. The computer-readable medium of claim 22 further comprising instructions which when executed by a processor causes the processor to:
reduce one of either the duty cycle or speed of an inverse Fast Fourier Transform module if at least one of time spreading and frequency spreading are disabled, wherein a transmission rate from the wireless transmitter device remains the same despite the reduction of duty cycle or speed of the inverse Fast Fourier Transform module.

24. A method for reducing power consumption in wireless receiver device, comprising:
receiving an indicator from a transmitter device indicating at least one of two modes of symbol transmission, wherein the modes of transmission including
a first mode of symbol transmission where the receiver device enables at least one of time spreading and frequency spreading for a particular transmission rate, and
a second mode of symbol transmission where the receiver device disables at least one of time spreading and frequency spreading relative to the first mode of symbol transmission and the same particular transmission rate; and reducing one of either the duty cycle or processing speed of a Fast Fourier Transform module in the second mode relative to the first mode for the same particular transmission rate.

25. The method of claim 24, wherein time spreading includes the transmission of the same symbol at a plurality of different times over different frequencies.

26. The method of claim 24, wherein frequency spreading includes the concurrent transmission of the same symbol over different frequencies.

27. The method of claim 24, wherein for a first data transmission rate the first mode of symbol transmission utilizes time spreading but the second mode of symbol transmission disables time spreading.

28. The method of claim 24, wherein for a second data transmission rate the first mode of symbol transmission utilizes both time spreading and frequency spreading but the second mode of symbol transmission disables at least one of time spreading and frequency spreading.

29. The method of claim 24, further comprising:
receiving a symbol transmitted according to the first mode, if the first mode is indicated; and
receiving a symbol transmitted according to the second mode, if the second mode is indicated.

30. The method of claim 24, wherein the Fast Fourier Transform module is part of a receiver chain for the wireless receiver terminal.

31. The method of claim 24, wherein the receiver device is compliant with the ultra wideband European Computer Manufacturers Association (ECMA) 368 standard.

32. The method of claim 24, wherein when using the second mode for symbol reception the method further comprising:
receiving the same version of a symbol over the same frequency over a plurality of symbol transmission periods;
accumulating the received versions of the symbol;
disabling the Fast Fourier Transform until all versions of the symbol have been received to conserve power; and
processing the accumulated symbol using the Fast Fourier Transform module.

33. The method of claim 24, wherein when using the second mode for symbol reception the method further comprising:
receiving a symbol just once instead of a plurality of times over a plurality of symbol transmission periods as in the first mode, wherein the symbol is transmitted at a higher power than used in the first mode for the same symbol transmission; and
disabling the Fast Fourier Transform module during time periods when the symbol would have otherwise been retransmitted in the first mode of symbol transmission.

34. A wireless receiver device, comprising:
a transmission mode detector for receiving an indicator from a transmitter device indicating at least one of two modes of symbol transmission; and
a receiver chain including a Fast Fourier Transform module, the receiver chain adapted to:
receive a symbol according to a first mode where the receiver device enables at least one of time spreading and frequency spreading for a particular transmission rate,
receive the symbol according to a second mode where the receiver device disables at least one of time spreading and frequency spreading relative to the first mode of symbol transmission and the same particular transmission rate; and reduce one of either the duty cycle or processing speed of the Fast Fourier Transform module in the second mode relative to the first mode for the same particular transmission rate.

35. The receiver device of claim 34, wherein for a first data transmission rate the first mode of symbol transmission utilizes time spreading but the second mode of symbol transmission disables time spreading.

36. The receiver device of claim 34, wherein for a second data transmission rate the first mode of symbol transmission utilizes both time spreading and frequency spreading but the second mode of symbol transmission disables at least one of time spreading and frequency spreading.

37. A wireless receiver device, comprising:
means for receiving an indicator from a transmitter device indicating at least one of two modes of symbol transmission, wherein the modes of transmission including
a first mode of symbol transmission where the receiver device enables at least one of time spreading and frequency spreading for a particular transmission rate, and
a second mode of symbol transmission where the receiver device disables at least one of time spreading and frequency spreading relative to the first mode of symbol transmission and the same particular transmission rate; and
means for reducing one of either the duty cycle or processing speed of a Fast Fourier Transform module in the second mode relative to the first mode for the same particular transmission rate.

38. The receiver device of claim 37, further comprising:
means for receiving the same version of a symbol over the same frequency over a plurality of symbol transmission periods;
means for accumulating the received versions of the symbol;
means for disabling the Fast Fourier Transform until all versions of the symbol have been received to conserve power;
means for processing the accumulated symbol using the Fast Fourier Transform module.

39. The receiver device of claim 37, further comprising:
means for receiving a symbol just once instead of a plurality of times over a plurality of symbol transmission periods as in the first mode, wherein the symbol is transmitted at a higher power than used in the first mode for the same symbol transmission; and
means for disabling the Fast Fourier Transform module during time periods when the symbol would have otherwise been retransmitted in the first mode of symbol transmission.

40. A computer-readable medium comprising instructions for reducing power consumption of a wireless receiver device, which when executed by a processor causes the processor to:
receive an indicator from a transmitter device indicating at least one of two modes of symbol transmission, wherein the modes of transmission including
a first mode of symbol transmission where the receiver device enables at least one of time spreading and frequency spreading for a particular transmission rate, and
a second mode of symbol transmission where the receiver device disables at least one of time spreading and frequency spreading relative to the first mode of symbol transmission and the same particular transmission rate; and
reduce one of either the duty cycle or processing speed of a Fast Fourier Transform module in the second mode relative to the first mode for the same particular transmission rate.

* * * * *